US012552755B2

(12) United States Patent
Kwak et al.

(10) Patent No.: US 12,552,755 B2
(45) Date of Patent: Feb. 17, 2026

(54) CINNAMIC AMIDE DERIVATIVE HAVING FXR ACTIVATING EFFECT, PHARMACEUTICAL COMPOSITION CONTAINING THE SAME AS ACTIVE INGREDIENT, AND METHOD FOR PREPARING THE SAME

(71) Applicants: KYUNGSUNG UNIVERSITY INDUSTRY COOPERATION FOUNDATION, Busan (KR); PUSAN NATIONAL UNIVERSITY INDUSTRY-UNIVERSITY COOPERATION FOUNDATION, Busan (KR)

(72) Inventors: Jae-Hwan Kwak, Busan (KR); Young-Suk Jung, Incheon (KR); Doyoung Kwon, Jeju-si (KR); Min Woo Kim, Busan (KR); Sou Hyun Kim, Seoul (KR)

(73) Assignees: KYUNGSUNG UNIVERSITY INDUSTRY COOPERATION FOUNDATION, Busan (KR); PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 843 days.

(21) Appl. No.: 17/773,349

(22) PCT Filed: Oct. 28, 2020

(86) PCT No.: PCT/KR2020/014763
§ 371 (c)(1),
(2) Date: Apr. 29, 2022

(87) PCT Pub. No.: WO2021/085991
PCT Pub. Date: May 6, 2021

(65) Prior Publication Data
US 2023/0339870 A1 Oct. 26, 2023

(30) Foreign Application Priority Data
Oct. 30, 2019 (KR) ........................ 10-2019-0136439

(51) Int. Cl.
*C07D 261/08* (2006.01)
*C07C 231/14* (2006.01)
*C07C 235/34* (2006.01)

(52) U.S. Cl.
CPC .......... *C07D 261/08* (2013.01); *C07C 231/14* (2013.01); *C07C 235/34* (2013.01)

(58) Field of Classification Search
CPC .... C07D 261/08; C07C 231/44; C07C 235/34
See application file for complete search history.

(56) References Cited

U.S. PATENT DOCUMENTS 4,981,680 A 1/1991 Hori et al.

FOREIGN PATENT DOCUMENTS

CN 101255124 A 9/2008
EP 0 407 200 B1 6/1994

OTHER PUBLICATIONS

CA Reg No. 62430-41-5, entered into STN on Nov. 16, 1984, p. 1-3 (Year: 1984).*
CA Reg No. 1608348-60-2, entered into STN on May 23, 2014, p. 1-3 (Year: 2014).*
Office Action issued May 26, 2023 in Korean Application No. 10-2020-0141027.
Sangku Lee, et al., "Hydroxylated Hydrocinnamides as Hypocholesterolemic Agents", Bull. Korean Chem. Soc., 2007, vol. 28, No. 10, pp. 1787-1791 (5 pages).
Maya Spasova et al., "Synthesis of cinnamoyl and hydroxycinnamoyl amino acid conjugates and evaluation of their antioxidant activity", Journal of Peptide Science, J. Peptide Sci. 2006, pp. 369-375, vol. 12.
Maya G. Chochkova et al., "Structure-Activity Relationships of N-Cinnamoyl and Hydroxycinnamoyl Amides on α-Glucosidase Inhibition", Hindawi, Journal of Chemistry, vol. 2017, Article ID 6080129, 5 pages.
Yanqiao Zhang et al., "Activation of the nuclear receptor FXR improves hyperglycemia and hyperlipidemia in diabetic mice", PNAS, Jan. 24, 2006, pp. 1006-1011, vol. 103, No. 4.
International Search Report of PCT/KR2020/014763 dated Feb. 15, 2021 [PCT/ISA/210].

* cited by examiner

*Primary Examiner* — Adam C Milligan
*Assistant Examiner* — Karen Cheng
(74) *Attorney, Agent, or Firm* — Sughrue Mion, PLLC

(57) ABSTRACT

The present disclosure relates to a pharmaceutical composition containing a cinnamic amide derivative that activates FXR or an isomer, solvate, or pharmaceutically acceptable salt thereof, and a method for preparing the same.

7 Claims, 6 Drawing Sheets

CINNAMIC AMIDE DERIVATIVE HAVING FXR ACTIVATING EFFECT, PHARMACEUTICAL COMPOSITION CONTAINING THE SAME AS ACTIVE INGREDIENT, AND METHOD FOR PREPARING THE SAME

CROSS REFERENCE TO RELATED APPLICATIONS

This application is a National Stage of International Application No. PCT/KR2020/014763, filed Oct. 28, 2020, claiming priority to Korean Patent Application No. 10-2019-0136439, filed Oct. 30, 2019, the entire disclosures of which are incorporated herein by reference.

TECHNICAL FIELD

The present disclosure relates to a cinnamic amide derivative that activates FXR or an isomer, solvate, or pharmaceutically acceptable salt thereof, a method for preparing the same, and a pharmaceutical composition for preventing, ameliorating, or treating a metabolic disease, which contains the same as an active ingredient.

BACKGROUND ART

Diabetes, obesity, dyslipidemia, hypertension, and the like are factors that constitute a pathological condition called "metabolic syndrome", which is caused by abnormalities in common metabolic regulation in the body. Metabolic syndrome increases the risk of death due to cardiovascular disease, and in the United States, its prevalence is known to reach 23.7% and its seriousness is emerging. According to a recent report in Korea, the prevalence of metabolic syndrome is about 29%, metabolic syndrome is known to be more common as the socioeconomic status is lower, and interest in the treatment and prevention of metabolic syndrome is increasing. Recently, as it has been revealed that nuclear receptors (NR) play an important role in the pathophysiology of metabolic syndrome, studies on the regulators of nuclear receptor activity and their mechanisms and studies on the development of new drugs for metabolic syndrome therethrough are being actively carried out.

Nuclear receptors are a kind of transcription factor and are activated through ligand-receptor responses by ligands. Unlike extracellular receptors that respond by peptide ligands, it is known that the main mechanism of action of a nuclear receptor is to bind directly to fat-soluble hormones or ligands that have entered the cell, to move to a target gene located in the nucleus, to regulate the transcriptional mechanism, and to regulate the expression of the corresponding gene.

Among others, FXR (farnesoid X receptor) is a nuclear receptor for bile acids and is expressed in the enterohepatic system of bile, kidneys, and adrenal glands. When FXR is activated by bile acids, FXR binds to FXR response elements (FXREs) in DNA and regulates the transcription of specific genes. At this time, FXR forms a heterodimer with a monomer or retinoid X receptor (RXR), another nuclear receptor, and acts in the form of FXR/RXR. In the human body, FXR exists in four isoforms of FXRα1, FXRα2, FXRα3, and FXRα4, FXRα3 and FXRα4 are also called FXRβ1 and FXRβ2, respectively, and FXRα2 and FXRβ2 bind to FXREs more favorably than FXRα1 and FXRβ1. These isoforms of FXR are involved in the metabolism of bile acids, and their expression levels differ depending on the tissue.

Specifically, the genes, which expressions are induced by FXR, are mainly involved in the expression of proteins (bile salt efflux pump, multidrug-resistance proteins 2 and 3) that secrete bile acids or excrete phospholipids into bile and the expression of a protein (phospholipid transfer protein) that transports cholesterol from HDL in the blood to the liver. Indirectly, the genes inhibit CYP7A1, the rate-determining enzyme of bile acid production, through negative feedback. FXR-deficient mice have increased blood bile acid concentrations, increased total bile acid amount, and increased fecal bile acid excretion. This may be said to be a result of the breakdown of the balance between the production and excretion of bile acids caused by damage to the feedback mechanism that inhibits the mechanism of bile acid production in the liver. This imbalance inhibits the degradation of HDL while increasing the serum total cholesterol and triglycerides, and also increases the HDL concentration. Therefore, administration of FXR agonists can reduce triglycerides in the liver and serum. According to recent studies, it has been reported that the activation of FXR can normalize glucose metabolism by reducing insulin resistance, can protect or regenerate hepatocytes, and has the effect of reducing growth of bacteria in the intestine and inhibiting tumor formation.

Hence, FXR agonists that can modulate FXR for the management of liver, intestine and metabolic diseases are being developed. GW4064, one of these, is an FXR agonist and exhibits high activity. However, in order to secure superior lead substances, it is necessary to study the diversity of the structure, such as verification of the effect obtained by various functional groups.

SUMMARY OF INVENTION

Technical Problem

An object of the present disclosure is to provide a pharmaceutical composition capable of preventing, ameliorating, or treating a metabolic disease by activating FXR action, maintaining energy homeostasis, and regulating bile acid, lipid, and glucose metabolism, which comprises a cinnamic amide derivative or an isomer, solvate or pharmaceutically acceptable salt thereof, and a method for preparing the same.

Solution to Problem

According to an embodiment of the present disclosure, there is provided a cinnamic amide derivative represented by the following Chemical Formula 1 or an isomer, solvate, or pharmaceutically acceptable salt thereof:

[Chem. 1]

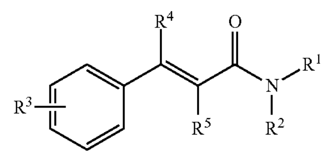

where $R^1$, $R^2$, $R^3$, $R^4$ and $R^5$ may be each independently selected from the group consisting of hydrogen, a hydroxyl group, a substituted or unsubstituted C1 to C40 alkyl group; a substituted or unsubstituted C2 to C40 alkenyl group; a substituted or unsubstituted C2 to C40 alkynyl group; a substituted or unsubstituted C6 to C40 aryl group; a substituted or unsubstituted heteroaryl group having 5 to 40 nuclear atoms; a substituted or unsubstituted heteroaryloxy group having 5 to 40 nuclear atoms; a substituted or unsubstituted C6 to C40 aryloxy group; a substituted or unsubstituted C1 to C40 alkyloxy group; a substituted or unsubstituted C6 to C40 arylamine group; a substituted or unsubstituted C1 to C40 alkylamine group; a C1 to C40 alkyl group having substituted or unsubstituted C6 to C40 aryl; a C1 to C40 alkyl group having substituted or unsubstituted heteroaryl having 5 to 40 nuclear atoms; a C1 to C40 alkyl group having substituted or unsubstituted 1 to 6 alcohol groups; a C1 to C40 alkyl group having a substituted or unsubstituted C1 to C40 amine; a substituted or unsubstituted C3 to C40 cycloalkyl group; and a substituted or unsubstituted heterocycloalkyl group having 3 to 40 nuclear atoms.

According to another embodiment of the present disclosure, there is provided a pharmaceutical composition for preventing, ameliorating, or treating a metabolic disease, which contains the cinnamic amide derivative or an isomer, solvate, or pharmaceutically acceptable salt thereof.

Advantageous Effects of Invention

The cinnamic amide derivative or an isomer, solvate, or pharmaceutically acceptable salt thereof and the pharmaceutical composition containing the same according to an embodiment of the present disclosure may be proposed as a composition for preventing, ameliorating, or treating various metabolic diseases.

The cinnamic amide derivative or an isomer, solvate, or pharmaceutically acceptable salt thereof and the pharmaceutical composition containing the same according to another embodiment may be proposed as a composition for preventing, ameliorating, or treating diabetes, obesity, dyslipidemia, hypertension, hyperinsulinemia, hyperlipidemia, hypertriglyceridemia, arteriosclerosis, cardiovascular disease, and the like. More specifically, the cinnamic amide derivative or an isomer, solvate, or pharmaceutically acceptable salt thereof and the pharmaceutical composition containing the same may be proposed as a composition for preventing, ameliorating, or treating liver disease [non-alcoholic steatohepatitis (NASH) and non-alcoholic fatty liver disease (NAFLD)], lung disease [non-small cell lung cancer (NSCLC)], breast cancer, ischemia-reperfusion injury, and the like.

The cinnamic amide derivative or an isomer, solvate, or pharmaceutically acceptable salt thereof and the pharmaceutical composition containing the same according to another embodiment may be proposed as a pharmaceutical composition for activating FXR.

DESCRIPTION OF EMBODIMENTS

Figure 1:
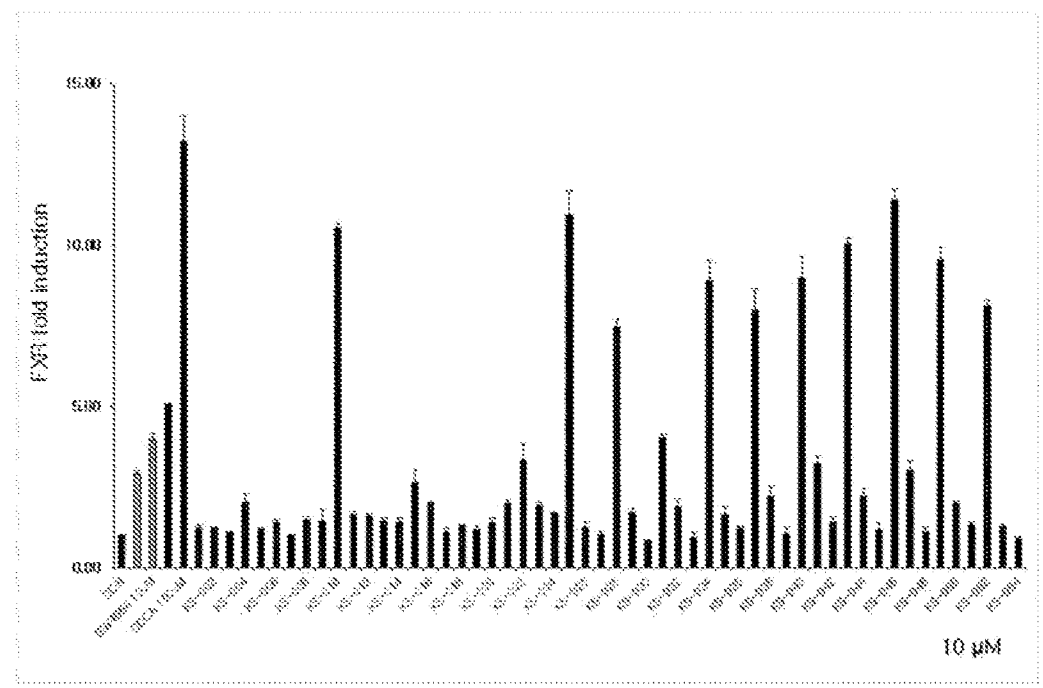
FIG. 1 is a schematic diagram of data for comparing the FXR activating effect of a cinnamic amide derivative according to the present disclosure with that of GW4064, an FXR agonist.
Figure 2:
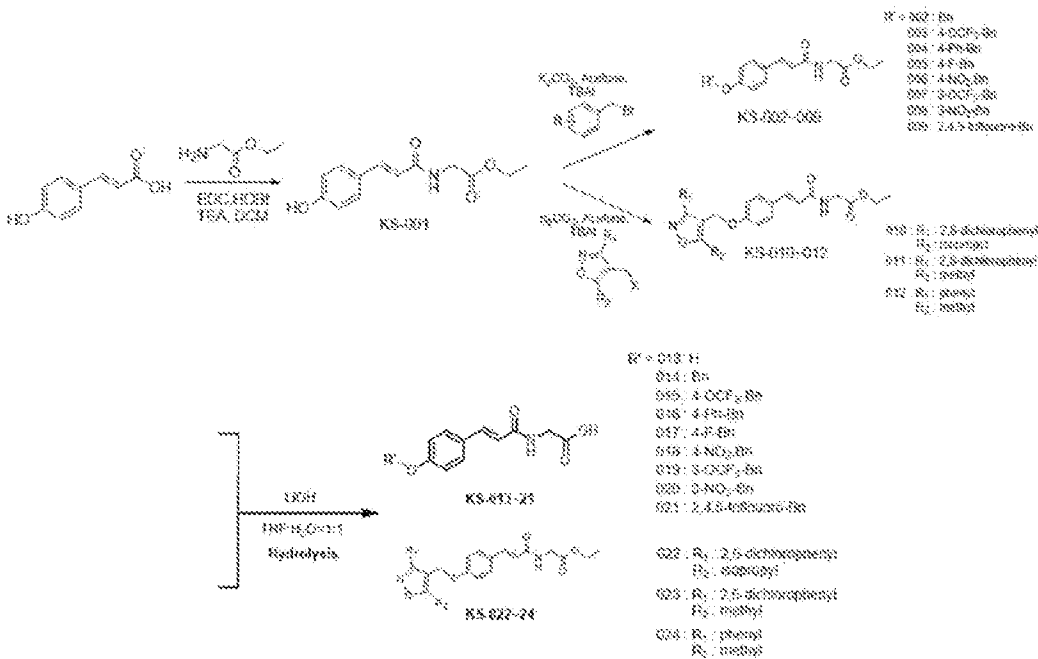
FIG. 2 is a schematic diagram of Example in which a cinnamic amide derivative is prepared.
Figure 3:
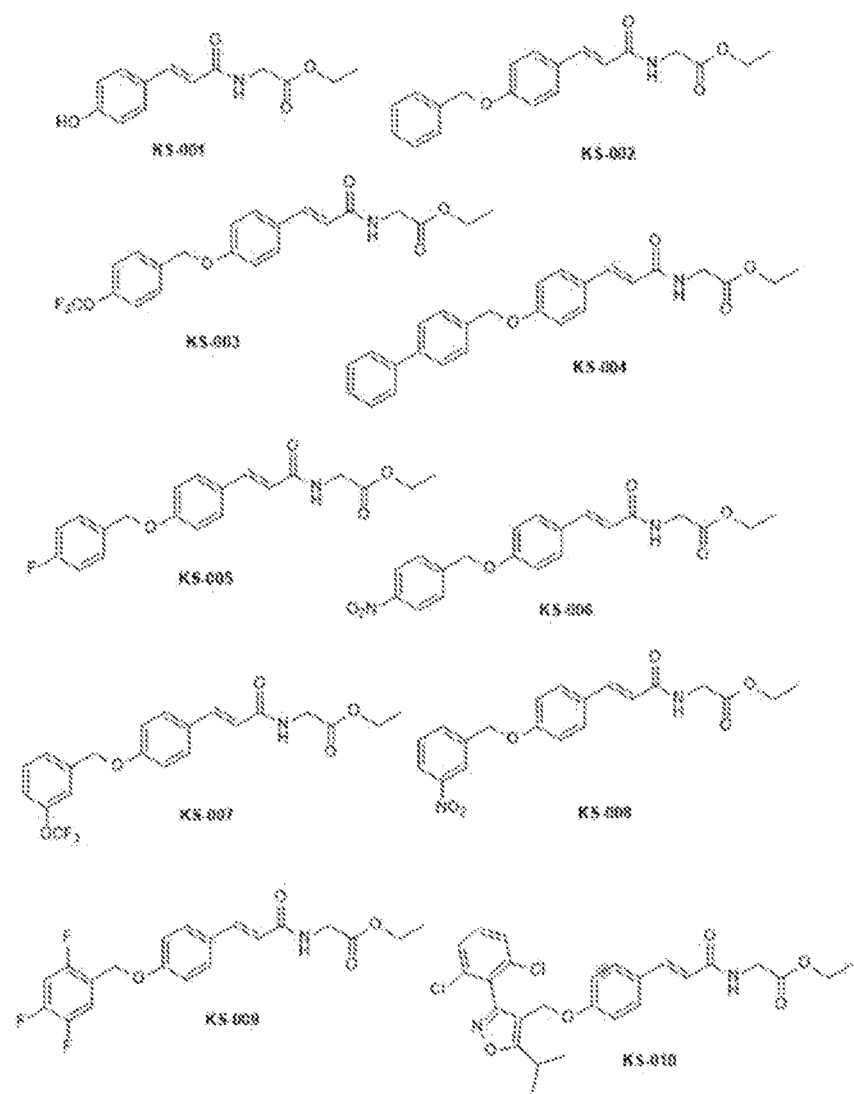
FIGS. 3 to 8 are schematic diagrams of the structures of cinnamic amide derivatives synthesized according to the present disclosure.
Figure 4:
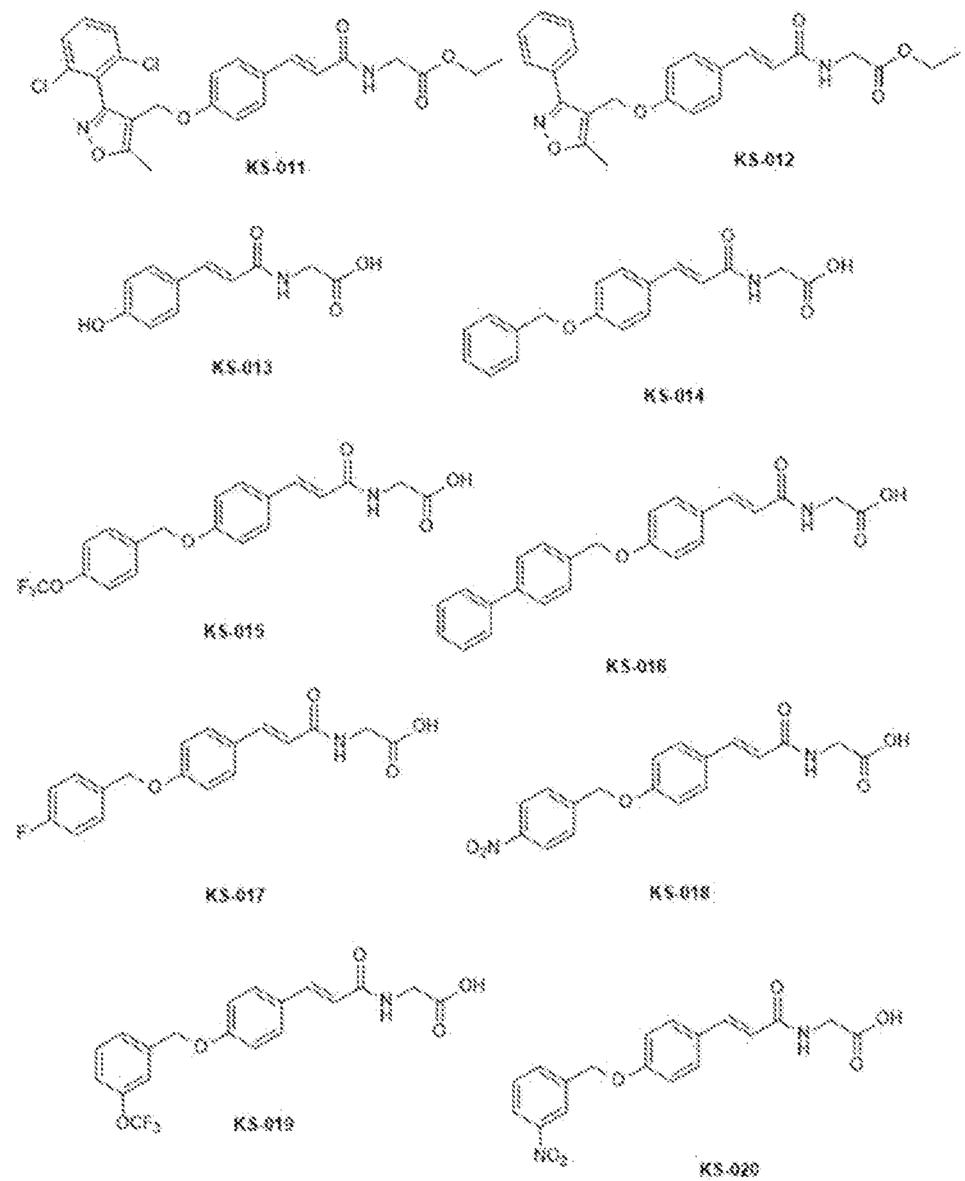
Figure 5:
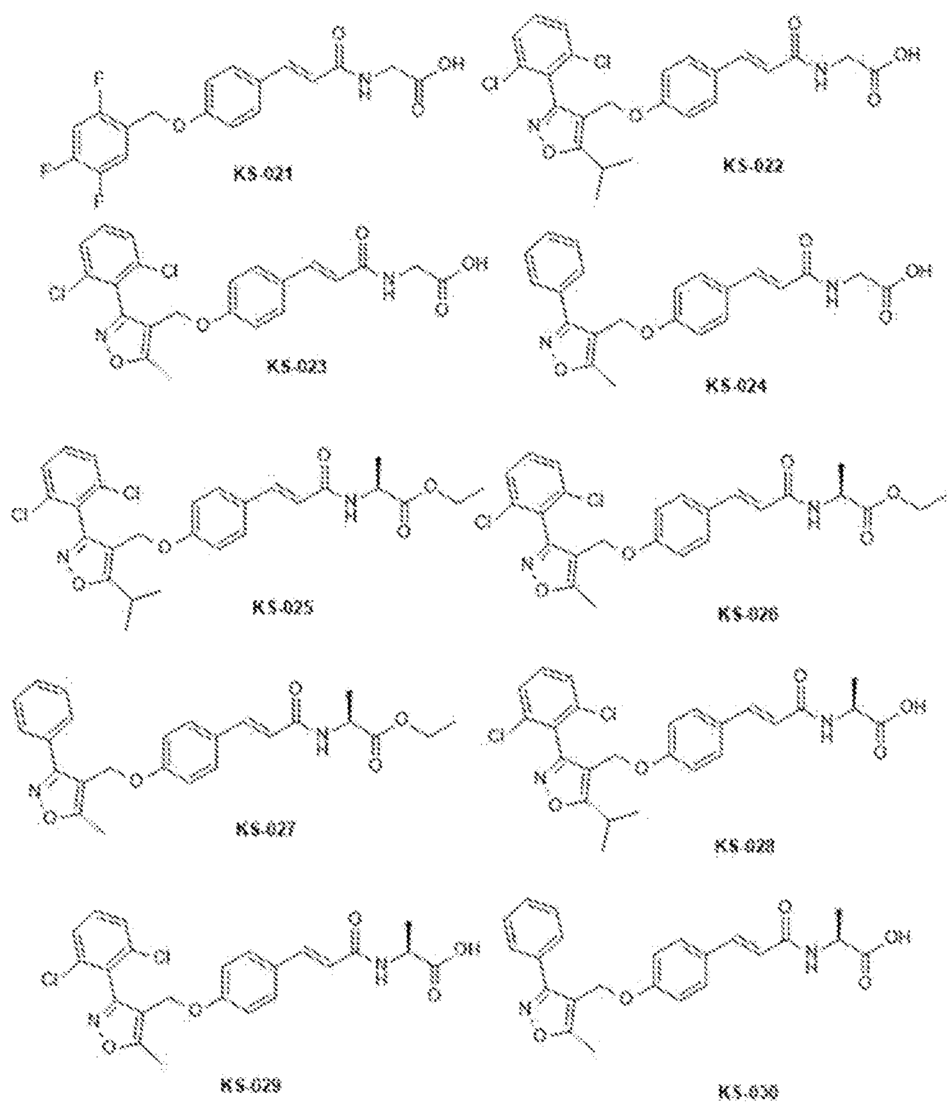
Figure 6:
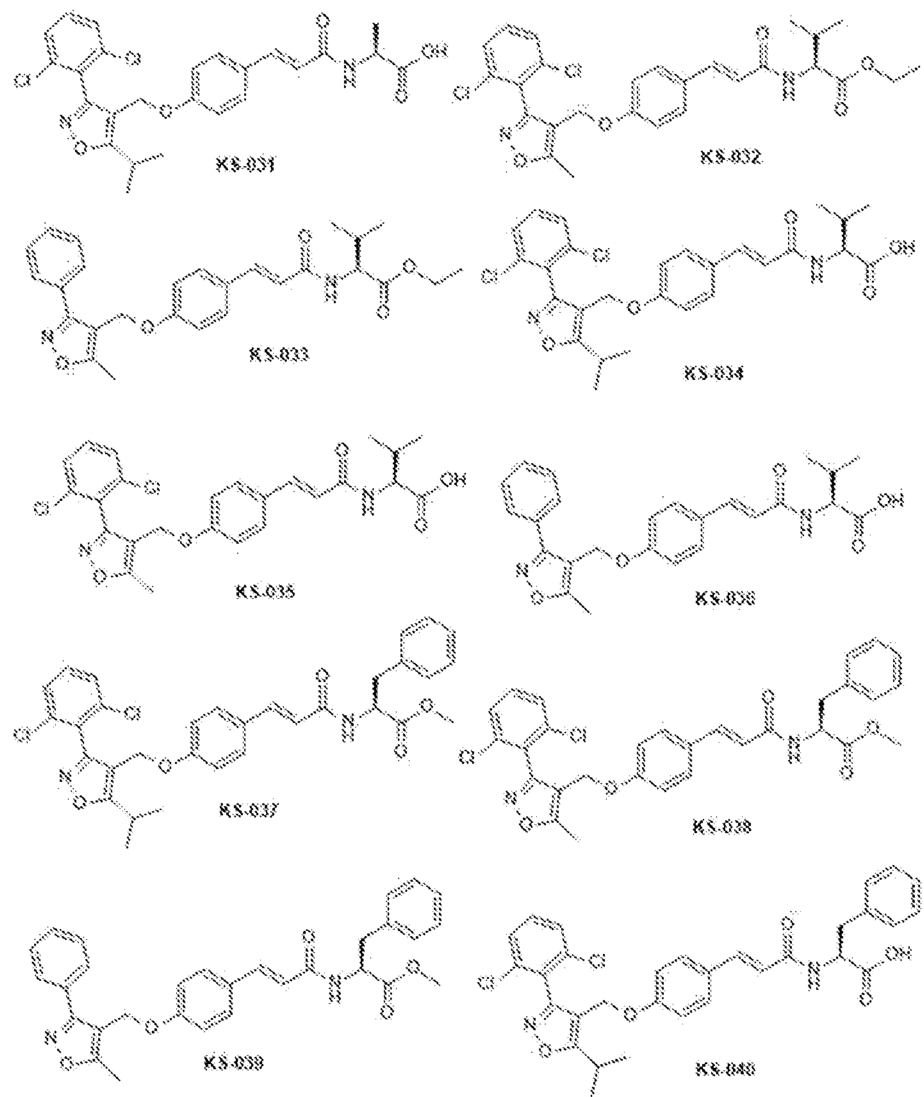
Figure 7:
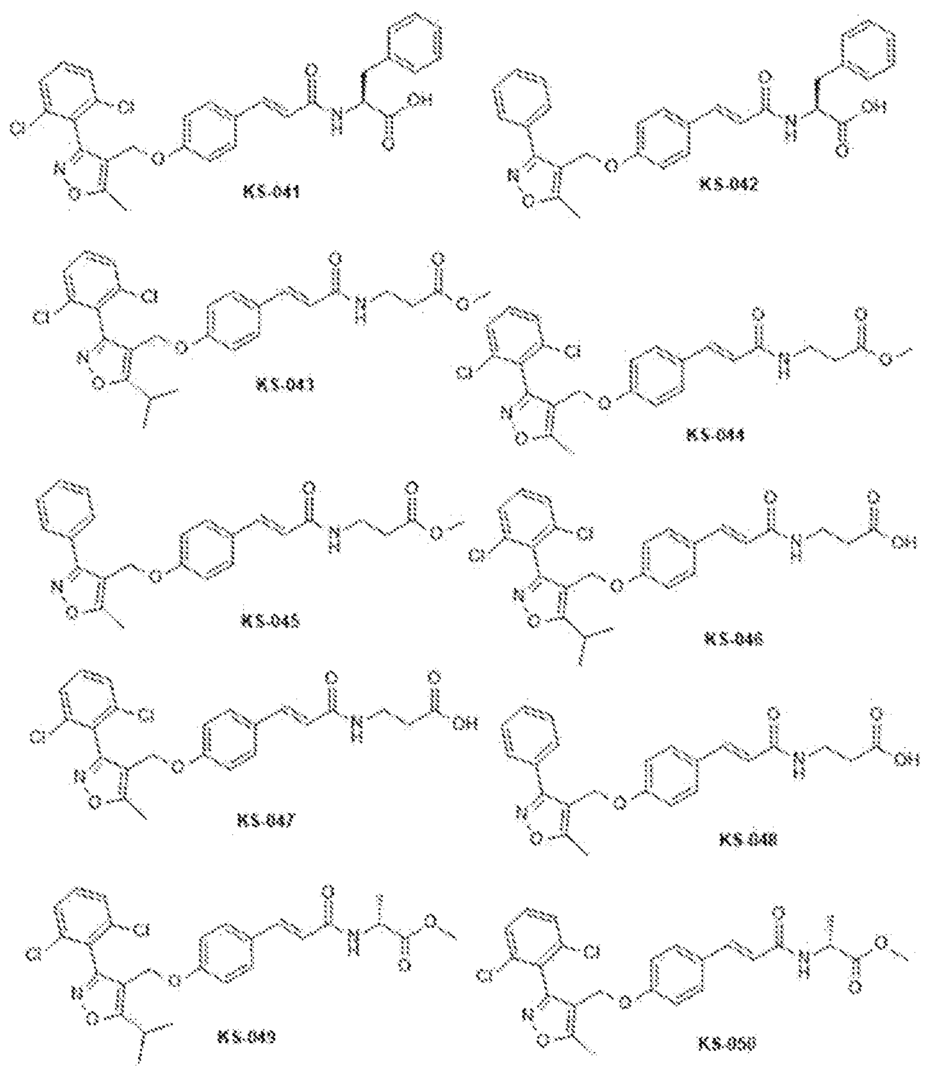
Figure 8:
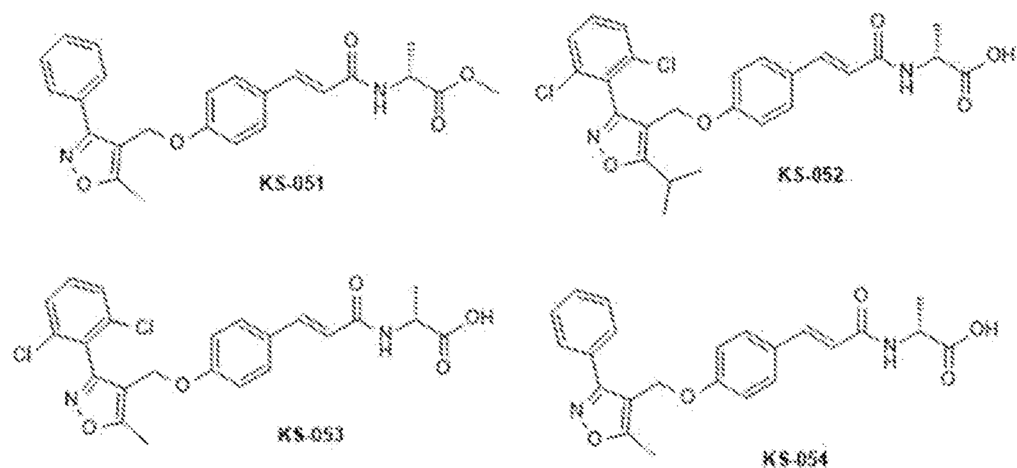

The present invention can all be achieved by the following description. It should be understood that the following description describes embodiments of the present invention, and the present invention is not necessarily limited thereto. In addition, it should be understood that the accompanying drawings are provided to aid understanding, and the present invention is not limited thereto.

The embodiments of the present disclosure may be embodied in various forms, and various modifications may be added thereto. Accordingly, it should be understood to include all modifications, equivalents, and substitutes within the scope in which the identity of spirit and technical features of the present disclosure are acknowledged.

Unless otherwise specified, all numbers used in the present disclosure are to be understood as modified by the term “about” in all instances. The modifier “about” is intended to have a generally recognized approximate meaning, may be more precisely interpreted as meaning within a certain percentage of the value modified, and may more specifically mean±20%, ±10%, ±5%, ±2%, or ±1% or less than this.

Terms used in the present disclosure may be defined as follows. Terms that are not defined in the present disclosure may be defined in a category that can be commonly understood or learned in the technical field to which the present invention pertains.

An “alkyl group” may mean a chain or cyclic (cyclo) group derived from a straight-chain or branched-chain saturated or unsaturated hydrocarbon, and may be substituted or unsubstituted. Examples of such an alkyl group having 1 to 6 carbon atoms include methyl (Me, $—CH_3$), ethyl (Et, $—CH_2CH_3$), 1-propyl (n-Pr, n-propyl, $—CH_2CH_2CH_3$), 2-propyl (i-Pr, i-propyl, $—CH(CH_3)_2$), cyclopropyl ($—CH_2CH_2CH_2—$), 1-butyl (n-Bu, n-butyl, $—CH_2CH_2CH_2CH_3$), 2-methyl-1-propyl (i-Bu, i-butyl, $—CH_2CH(CH_3)_2$), 2-butyl (s-Bu, s-butyl, $—CH(CH_3)CH_2CH_3$), 2-methyl-2-propyl (t-Bu, t-butyl, $—C(CH_3)_3$), cyclobutyl ($—CH_2CH_2CH_2CH_2—$), 1-pentyl (n-pentyl, $—CH_2CH_2CH_2CH_2CH_3$), 2-pentyl ($—CH(CH_3)CH_2CH_2CH_3$), 3-pentyl ($—CH(CH_2CH_3)_2$), 2-methyl-2-butyl ($—C(CH_3)_2CH_2CH_3$), 3-methyl-2-butyl ($—CH(CH_3)CH(CH_3)_2$), 3-methyl-1-butyl ($—CH_2CH_2CH(CH_3)_2$), 2-methyl-1-butyl ($—CH_2CH(CH_3)CH_2CH_3$), cyclopentyl ($—CH_2CH_2CH_2CH_2CH_2—$), 1-hexyl ($—CH_2CH_2CH_2CH_2CH_2CH_3$), 2-hexyl ($—CH(CH_3)CH_2CH_2CH_2CH_3$), 3-hexyl ($—CH(CH_2CH_3)(CH_2CH_2CH_3)$), 2-methyl-2-pentyl ($—C(CH_3)_2CH_2CH_2CH_3$), 3-methyl-2-pentyl ($—CH(CH_3)CH(CH_3)CH_2CH_3$), 4-methyl-2-pentyl ($—CH(CH_3)CH_2CH(CH_3)_2$), 3-methyl-3-pentyl ($—C(CH_3)(CH_2CH_3)_2$), 2-methyl-3-pentyl ($—CH(CH_2CH_3)CH(CH_3)_2$), 2,3-dimethyl-2-butyl ($—C(CH_3)_2CH(CH_3)_2$), 3,3-dimethyl-2-butyl ($—CH(CH_3)C(CH_3)_3$, and cyclohexyl ($—CH_2CH_2CH_2CH_2CH_2CH_2—$), but these are only examples, and the alkyl group of the present disclosure is not limited to alkyl groups having 1 to 6 carbon atoms.

An “alkoxy group” is a monovalent group having an —O-alkyl group, and may be understood to include all of straight-chain, branched-chain, and cyclic structures. The alkyl group includes all of the previously defined alkyl groups, and the alkyl group may be substituted or unsubstituted. Examples of such an alkoxy group include, but are not limited to, methoxy, ethoxy, propoxy, butoxy, and isobutoxy.

An "aryl group" may mean a monovalent group derived from an aromatic hydrocarbon formed of a single ring or a combination of two or more rings, may be substituted or unsubstituted, and may also include a form in which two or more rings are simply attached to each other or condensed. Examples of such an aryl group include, but are not limited to, phenyl, naphthyl, phenanthryl, and anthryl.

A "heteroaryl group" may mean a structure in which at least one carbon in a saturated ring, an unsaturated ring, or an aromatic ring is substituted with a hetero atom (for example, N, O or S) to form a ring skeleton. Such heterocycles may be substituted or unsubstituted, and examples thereof include, but are not limited to, 6-membered monocyclic rings such as pyrrole, pyrazole, imidazole, 1,2,3-triazole, 1,2,4-triazole, tetrazole, pyridyl, pyrazinyl, pyrimidinyl, pyridazinyl, and triazinyl; polycyclic rings such as phenoxathienyl, indolizinyl, indolyl, purinyl, quinolyl, benzothiazole, and carbazolyl; and 2-furanyl, N-imidazolyl, 2-isoxazolyl, 2-pyridinyl, and 2-pyrimidinyl.

A "carbonyl group" may mean the generic term for groups having a carbon-oxygen double bond, and may include a ketone group, an aldehyde group, and a carboxyl group.

A "carboxyl group" may mean a structure in which one oxygen atom is further bonded to a carbonyl group in which an oxygen atom is connected to a central carbon atom by a double bond, and various substituents may be placed at the remaining bonding sites of carbon and oxygen.

A "halogen" may mean at least one halogen atom or substituent, and examples thereof include fluorine, bromine, chlorine, or iodine. In addition, in a general formula, halogen may be usually represented by X.

An "alkali" may mean at least one alkali metal atom or substituent, and examples thereof include lithium, sodium, potassium, cesium, rubidium, or francium.

Terms not defined in the present disclosure may be understood as terms that are generally and commonly used in the technical field to which the present invention pertains.

The pharmaceutical composition for preventing, ameliorating and/or treating metabolic syndrome according to the present disclosure may contain a compound represented by the following Chemical Formula 1, an isomer, solvate, or pharmaceutically acceptable salt of the compound, and/or a combination of these:

[Chem. 1]

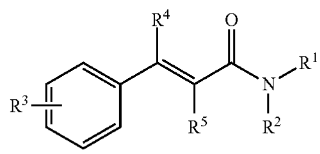

where $R^1$, $R^2$, $R^3$, $R^4$ and $R^5$ may be each independently selected from the group consisting of hydrogen, a hydroxyl group, a substituted or unsubstituted C1 to C40 alkyl group; a substituted or unsubstituted C2 to C40 alkenyl group; a substituted or unsubstituted C2 to C40 alkynyl group; a substituted or unsubstituted C6 to C40 aryl group; a substituted or unsubstituted heteroaryl group having 5 to 40 nuclear atoms; a substituted or unsubstituted heteroaryloxy group having 5 to 40 nuclear atoms; a substituted or unsubstituted C6 to C40 aryloxy group; a substituted or unsubstituted C1 to C40 alkyloxy group; a substituted or unsubstituted C6 to C40 arylamine group; a substituted or unsubstituted C1 to C40 alkylamine group; a C1 to C40 alkyl group having substituted or unsubstituted C6 to C40 aryl; a C1 to C40 alkyl group having substituted or unsubstituted heteroaryl having 5 to 40 nuclear atoms; a C1 to C40 alkyl group having substituted or unsubstituted 1 to 6 alcohol groups; a C1 to C40 alkyl group having a substituted or unsubstituted C1 to C40 amine; a substituted or unsubstituted C3 to C40 cycloalkyl group; and a substituted or unsubstituted heterocycloalkyl group having 3 to 40 nuclear atoms, but are not limited thereto. The double bonds in Chemical Formula 1 may be trans-form or cis-form and may be E-form or Z-form.

According to an embodiment, $R^1$ and/or $R^2$ may be a substituted or unsubstituted amino acid. The amino acid may be glycine, alanine, valine, leucine, isoleucine, threonine, serine, cysteine, methionine, aspartic acid, asgine, glutamic acid, glutamine, lysine, arginine, histidine, phenylalanine, tyrosine, tryptophan, or proline, but is not limited thereto. $R^1$ and/or $R^2$ may be a structure having identity of one or more numerical values selected from among 50%, 60%, 70%, 80%, 90%, 95%, and 99% with the amino acid. The amino acid may form an ester bond at the C-terminus. Specifically, the substituent forming an ester bond at the C-terminus may be selected from the group consisting of a substituted or unsubstituted C1 to C40 alkyl group; a substituted or unsubstituted C2 to C40 alkenyl group; a substituted or unsubstituted C2 to C40 alkynyl group; a substituted or unsubstituted C6 to C40 aryl group; a substituted or unsubstituted heteroaryl group having to 40 nuclear atoms; a substituted or unsubstituted heteroaryloxy group having 5 to 40 nuclear atoms; a substituted or unsubstituted C6 to C40 aryloxy group; a substituted or unsubstituted C1 to C40 alkyloxy group; a substituted or unsubstituted C6 to C40 arylamine group; a substituted or unsubstituted C1 to C40 alkylamine group; a C1 to C40 alkyl group having substituted or unsubstituted C6 to C40 aryl; a C1 to C40 alkyl group having substituted or unsubstituted heteroaryl having 5 to 40 nuclear atoms; a C1 to C40 alkyl group having substituted or unsubstituted 1 to 6 alcohol groups; a C1 to C40 alkyl group having a substituted or unsubstituted C1 to C40 amine; a substituted or unsubstituted C3 to C40 cycloalkyl group; and a substituted or unsubstituted heterocycloalkyl group having 3 to 40 nuclear atoms, but is not limited thereto. More specifically, the substituent forming an ester bond at the C-terminus may be a substituted or unsubstituted C1 to C6 alkyl group, a substituted or unsubstituted C1 to C6 alkyloxy group, a substituted or unsubstituted C1 to C6 carbonyl group, a substituted or unsubstituted C1 to C6 carboxyl group, an amine group, a thiol group, or a C1 to C6 alcohol group having 1 to 6 oxygen atoms.

In Chemical Formula 1,

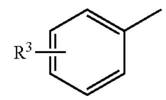

may be understood as meaning not to specify the substituent substituted on the benzene ring, the substituted position, and the number of substitutions. For example,

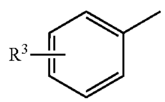

may include the meaning that $R^3$ may be substituted at least at one of positions 2, 3, 4, 5, and 6. For example,

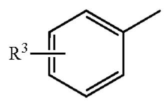

is collectively represented by $R^3$, but may include the meaning that a plurality of substituents represented by different $R^3$ may be substituted at different positions. Specifically,

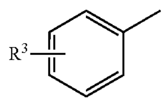

may include the meaning that $R^3$ may be expanded to at least two of $R^{3'}$, $R^{3''}$ $R^{3'''}$, $R^{3''''}$, or $R^{3'''''}$, which are different substituents, and each substituent may be substituted at least at two of positions 2, 3, 4, 5, and 6.

According to an embodiment, $R^3$ may be a substituted or unsubstituted C1 to C6 alkyl group, a substituted or unsubstituted C1 to C6 alkyloxy group, a substituted or unsubstituted C1 to C6 carbonyl group, a substituted or unsubstituted C1 to C6 carboxyl group, an amine group, a thiol group, or a C1 to C6 alcohol group having 1 to 6 oxygen atoms. Specifically, $R^3$ may be a C1 to C6 alkyl group having a substituted or unsubstituted heteroaryl group having 5 to 40 nuclear atoms; a C1 to C6 alkyloxy group having a substituted or unsubstituted heteroaryl group having 5 to 40 nuclear atoms; a C1 to C6 carbonyl group having a substituted or unsubstituted heteroaryl group having 5 to 40 nuclear atoms; a C1 to C6 carboxyl group having a substituted or unsubstituted heteroaryl group having 5 to 40 nuclear atoms; an amine group having a substituted or unsubstituted heteroaryl group having 5 to 40 nuclear atoms; a thiol group having a substituted or unsubstituted heteroaryl group having 5 to 40 nuclear atoms, or a C1 to C6 alcohol group having a substituted or unsubstituted heteroaryl group having 5 to 40 nuclear atoms. More specifically, $R^3$ may be a C1 to C6 alkyl group, alkyloxy group, carbonyl group, carboxyl group, amine group, thiol group or alcohol group having a heteroaryl group selected from the group consisting of substituted or unsubstituted pyrrole, substituted or unsubstituted dihydropyrrole, substituted or unsubstituted pyrrolidine, substituted or unsubstituted pyrazole, substituted or unsubstituted dihydropyrazole, substituted or unsubstituted pyrazolidine, substituted or unsubstituted triazole, substituted or unsubstituted dihydrotriazole, substituted or unsubstituted triazolidine, substituted or unsubstituted isoxazole, substituted or unsubstituted isoxazolidine, substituted or unsubstituted dihydroisoxazole, substituted or unsubstituted furan, substituted or unsubstituted dihydrofuran, and substituted or unsubstituted tetrahydrofuran.

For example, $R^3$ may be a C1 to C6 alkyloxy group substituted with substituted or unsubstituted isoxazole. Specifically, $R^3$ may be hydrogen, a hydroxyl group, a halogen group, an amine group, a carbonyl group, a C1 to C6 alkyloxy group substituted with a substituted or unsubstituted C6 to C14 aryl group or heteroaryl group having 5 to 30 nuclear atoms.

According to a specific embodiment, $R^3$ may be a substituted or unsubstituted benzyl group or benzoyl group. The substituent with which a benzyl group or benzoyl group is substituted may be at least one selected from the group consisting of a halogen group (X), a nitro group (—$NO_2$), a phenyl group (-Ph), a trifluoromethyl group (—$CF_3$), and a trifluoromethoxy group (—$OCF_3$), and the substituted position may be at least one position selected from positions 2, 3, 4, 5 and 6.

The pharmaceutical composition for preventing, ameliorating and/or treating metabolic syndrome according to the present disclosure may contain a compound represented by the following Chemical Formula 2, an isomer, solvate, or pharmaceutically acceptable salt of the compound, and/or a combination of these.

[Chem. 2]

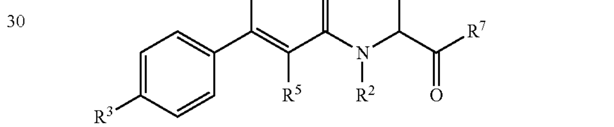

$R^2$, $R^3$, $R^4$, $R^5$, $R^6$ and $R^7$ in Chemical Formula 2 may be each independently selected from the group consisting of hydrogen, a hydroxyl group, a substituted or unsubstituted C1 to C40 alkyl group; a substituted or unsubstituted C2 to C40 alkenyl group; a substituted or unsubstituted C2 to C40 alkynyl group; a substituted or unsubstituted C6 to C40 aryl group; a substituted or unsubstituted heteroaryl group having 5 to 40 nuclear atoms; a substituted or unsubstituted heteroaryloxy group having 5 to 40 nuclear atoms; a substituted or unsubstituted C6 to C40 aryloxy group; a substituted or unsubstituted C1 to C40 alkyloxy group; a substituted or unsubstituted C6 to C40 arylamine group; a substituted or unsubstituted $C_1$ to C40 alkylamine group; a C1 to C40 alkyl group having substituted or unsubstituted C6 to C40 aryl; a C1 to C40 alkyl group having substituted or unsubstituted heteroaryl having 5 to 40 nuclear atoms; a C1 to C40 alkyl group having substituted or unsubstituted 1 to 6 alcohol groups; a C1 to C40 alkyl group having a substituted or unsubstituted C1 to C40 amine; a substituted or unsubstituted C3 to C40 cycloalkyl group; and a substituted or unsubstituted heterocycloalkyl group having 3 to 40 nuclear atoms, but are not limited thereto. The double bonds in Chemical Formula 2 may be trans-form or cis-form and may be E-form or Z-form.

According to an embodiment, $R^2$ in Chemical Formula 2 may be hydrogen or a hydroxyl group. For example, $R^2$ in Chemical Formula 2 may be a substituted or unsubstituted amino acid. The amino acid may be glycine, alanine, valine, leucine, isoleucine, threonine, serine, cysteine, methionine, aspartic acid, asgine, glutamic acid, glutamine, lysine, arginine, histidine, phenylalanine, tyrosine, tryptophan, or proline, but is not limited thereto. $R^1$ and/or $R^2$ may be a structure having identity of one or more numerical values selected from among 50%, 60%, 70%, 80%, 90%, 95%, and 99% with the amino acid. The amino acid may form an ester bond at the C-terminus. Specifically, the substituent forming an ester bond at the C-terminus may be selected from the group consisting of a substituted or unsubstituted C1 to C40 alkyl group; a substituted or unsubstituted C2 to C40 alkenyl group; a substituted or unsubstituted C2 to C40 alkynyl group; a substituted or unsubstituted C6 to C40 aryl group; a substituted or unsubstituted heteroaryl group having 5 to 40 nuclear atoms; a substituted or unsubstituted heteroaryloxy group having 5 to 40 nuclear atoms; a substituted or unsubstituted C6 to C40 aryloxy group; a substituted or unsubstituted C1 to C40 alkyloxy group; a substituted or unsubstituted C6 to C40 arylamine group; a substituted or unsubstituted C1 to C40 alkylamine group; a C1 to C40 alkyl group having substituted or unsubstituted C6 to C40 aryl; a C1 to C40 alkyl group having substituted or unsubstituted heteroaryl having 5 to 40 nuclear atoms; a C1 to C40 alkyl group having substituted or unsubstituted 1 to 6 alcohol groups; a C1 to C40 alkyl group having a substituted or unsubstituted C1 to C40 amine; a substituted or unsubstituted C3 to C40 cycloalkyl group; and a substituted or unsubstituted heterocycloalkyl group having 3 to 40 nuclear atoms, but is not limited thereto. More specifically, $R^7$ in Chemical Formula 2 may be a substituted or unsubstituted C1 to C6 alkyl group, a substituted or unsubstituted C1 to C6 alkyloxy group, a substituted or unsubstituted C1 to C6 carbonyl group, a substituted or unsubstituted C1 to C6 carboxyl group, an amine group, a thiol group, or a C1 to C6 alcohol group having 1 to 6 oxygen atoms.

According to an embodiment, $R^3$ in Chemical Formula 2 may be a substituted or unsubstituted C1 to C6 alkyl group, a substituted or unsubstituted C1 to C6 alkyloxy group, a substituted or unsubstituted C1 to C6 carbonyl group, a substituted or unsubstituted C1 to C6 carboxyl group, an amine group, a thiol group, or a C1 to C6 alcohol group having 1 to 6 oxygen atoms. Specifically, $R^3$ in Chemical Formula 2 may be a C1 to C6 alkyl group having a substituted or unsubstituted heteroaryl group having 5 to 40 nuclear atoms; a C1 to C6 alkyloxy group having a substituted or unsubstituted heteroaryl group having 5 to 40 nuclear atoms; a C1 to C6 carbonyl group having a substituted or unsubstituted heteroaryl group having 5 to 40 nuclear atoms; a C1 to C6 carboxyl group having a substituted or unsubstituted heteroaryl group having 5 to 40 nuclear atoms; an amine group having a substituted or unsubstituted heteroaryl group having 5 to 40 nuclear atoms; a thiol group having a substituted or unsubstituted heteroaryl group having 5 to 40 nuclear atoms, or a C1 to C6 alcohol group having a substituted or unsubstituted heteroaryl group having 5 to 40 nuclear atoms. More specifically, $R^3$ in Chemical Formula 2 may be a C1 to C6 alkyl group, alkyloxy group, carbonyl group, carboxyl group, amine group, thiol group or alcohol group having a heteroaryl group selected from the group consisting of substituted or unsubstituted pyrrole, substituted or unsubstituted dihydropyrrole, substituted or unsubstituted pyrrolidine, substituted or unsubstituted pyrazole, substituted or unsubstituted dihydropyrazole, substituted or unsubstituted pyrazolidine, substituted or unsubstituted triazole, substituted or unsubstituted dihydrotriazole, substituted or unsubstituted triazolidine, substituted or unsubstituted isoxazole, substituted or unsubstituted isoxazolidine, substituted or unsubstituted dihydroisoxazole, substituted or unsubstituted furan, substituted or unsubstituted dihydrofuran, and substituted or unsubstituted tetrahydrofuran.

For example, $R^3$ in Chemical Formula 2 may be a C1 to C6 alkyloxy group substituted with substituted or unsubstituted isoxazole. Specifically, $R^3$ in Chemical Formula 2 may be hydrogen, a hydroxyl group, a halogen group, an amine group, a carbonyl group, a C1 to C6 alkyloxy group substituted with a substituted or unsubstituted C6 to C14 aryl group or heteroaryl group having 5 to 30 nuclear atoms.

According to a specific embodiment, $R^3$ in Chemical Formula 2 may be a substituted or unsubstituted benzyl group or benzoyl group. The substituent with which a benzyl group or benzoyl group is substituted may be at least one selected from the group consisting of a halogen group (X), a nitro group ($-NO_2$), a phenyl group (-Ph), a trifluoromethyl group ($-CF_3$), and a trifluoromethoxy group ($-OCF_3$), and the substituted position may be at least one position selected from positions 2, 3, 4, 5 and 6.

According to an embodiment, $R^6$ in Chemical Formula 2 may be a substituted or unsubstituted C1 to C6 alkyl group, a substituted or unsubstituted C1 to C6 cycloalkyl group, a substituted or unsubstituted C1 to C6 alkyloxy group, a substituted or unsubstituted C1 to C6 alcohol group, a substituted or unsubstituted C1 to C6 alkylthiol group, a substituted or unsubstituted C1 to C6 alkylamine group, a substituted or unsubstituted C1 to C6 carboxyl group, a substituted or unsubstituted C1 to C6 alkylamide group, a substituted or unsubstituted C6 to C14 aryl group or a substituted or unsubstituted heteroaryl group having 5 to 20 nuclear atoms.

According to an embodiment, $R^7$ in Chemical Formula 2 may include a hydroxyl group, a thiol group, an amine group, a C1 to C6 alkyloxy group, a C1 to C6 carbonyl group, a C1 to C6 carboxyl group and the like, but is not limited thereto.

The pharmaceutical composition for preventing, ameliorating and/or treating metabolic syndrome according to the present disclosure may contain a compound represented by the following Chemical Formula 3, an isomer, solvate, or pharmaceutically acceptable salt of the compound, and/or a combination of these.

[Chem. 3]

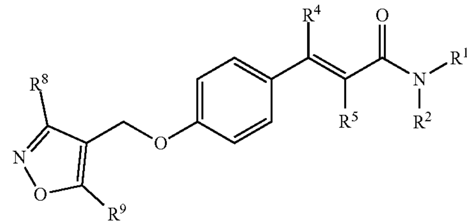

$R^1$, $R^2$, $R^4$, $R^5$, $R^8$ and $R^9$ in Chemical Formula 3 may be each independently selected from the group consisting of hydrogen, a hydroxyl group, a substituted or unsubstituted C1 to C40 alkyl group; a substituted or unsubstituted C2 to C40 alkenyl group; a substituted or unsubstituted C2 to C40 alkynyl group; a substituted or unsubstituted C6 to C40 aryl group; a substituted or unsubstituted heteroaryl group having 5 to 40 nuclear atoms; a substituted or unsubstituted heteroaryloxy group having 5 to 40 nuclear atoms; a substituted or unsubstituted C6 to C40 aryloxy group; a substituted or unsubstituted C1 to C40 alkyloxy group; a substituted or unsubstituted C6 to C40 arylamine group; a substituted or unsubstituted C1 to C40 alkylamine group; a C1 to C40 alkyl group having substituted or unsubstituted C6 to C40 aryl; a C1 to C40 alkyl group having substituted or unsubstituted heteroaryl having 5 to 40 nuclear atoms; a C1 to C40 alkyl group having substituted or unsubstituted 1 to 6 alcohol groups; a C1 to C40 alkyl group having a substituted or unsubstituted C1 to C40 amine; a substituted or unsubstituted C3 to C40 cycloalkyl group; and a substituted or unsubstituted heterocycloalkyl group having 3 to 40 nuclear atoms, but are not limited thereto. The double bonds in Chemical Formula 3 may be trans-form or cis-form and may be E-form or Z-form.

According to an embodiment, $R^1$ and/or $R^2$ may be a substituted or unsubstituted amino acid. The amino acid may be glycine, alanine, valine, leucine, isoleucine, threonine, serine, cysteine, methionine, aspartic acid, asgine, glutamic acid, glutamine, lysine, arginine, histidine, phenylalanine, tyrosine, tryptophan, or proline, but is not limited thereto. $R^1$ and/or $R^2$ may be a structure having identity of one or more numerical values selected from among 50%, 60%, 70%, 80%, 90%, 95%, and 99% with the amino acid. The amino acid may form an ester bond at the C-terminus. Specifically, the substituent forming an ester bond at the C-terminus may be selected from the group consisting of a substituted or unsubstituted C1 to C40 alkyl group; a substituted or unsubstituted C2 to C40 alkenyl group; a substituted or unsubstituted C2 to C40 alkynyl group; a substituted or unsubstituted C6 to C40 aryl group; a substituted or unsubstituted heteroaryl group having to 40 nuclear atoms; a substituted or unsubstituted heteroaryloxy group having 5 to 40 nuclear atoms; a substituted or unsubstituted C6 to C40 aryloxy group; a substituted or unsubstituted C1 to C40 alkyloxy group; a substituted or unsubstituted C6 to C40 arylamine group; a substituted or unsubstituted C1 to C40 alkylamine group; a C1 to C40 alkyl group having substituted or unsubstituted C6 to C40 aryl; a C1 to C40 alkyl group having substituted or unsubstituted heteroaryl having 5 to 40 nuclear atoms; a C1 to C40 alkyl group having substituted or unsubstituted 1 to 6 alcohol groups; a C1 to C40 alkyl group having a substituted or unsubstituted C1 to C40 amine; a substituted or unsubstituted C3 to C40 cycloalkyl group; and a substituted or unsubstituted heterocycloalkyl group having 3 to 40 nuclear atoms, but is not limited thereto.

According to an embodiment, $R^8$ in Chemical Formula 3 may be a substituted or unsubstituted C6 to C14 aryl group or heteroaryl group. For example, $R^8$ in Chemical Formula 3 may be a substituted or unsubstituted C6 to C10 aryl group or heteroaryl group. The substituent with which $R^8$ is substituted may be a C6 to C10 aryl group or heteroaryl group having 6 to 10 nuclear atoms, which has at least one substituent selected from the group consisting of a halogen group (X), a nitro group ($—NO_2$), a phenyl group (-Ph), a trifluoromethyl group ($—CF_3$), and a trifluoromethoxy group ($—OCF_3$), and the number of substituted positions may be one or two or more.

According to an embodiment, $R^9$ in Chemical Formula 3 may be selected from the group consisting of a C1 to C6 alkyl group, a C1 to C6 alcohol group having 1 to 6 oxygen atoms, a C1 to C6 alkoxy group, a C1 to C6 alkylamine group, a heteroaryl group having 5 to 20 nuclear atoms, and a C6 to C20 aryl group.

Specifically, $R^9$ may be a substituted or unsubstituted C1 to C6 alkyl group, a substituted or unsubstituted C1 to C6 alkyloxy group, a substituted or unsubstituted C1 to C6 carbonyl group, a substituted or unsubstituted C1 to C6 carboxyl group, an amine group, a thiol group, or a substituted or unsubstituted C1 to C6 alcohol group.

More specifically, $R^9$ may be methyl (Me, $—CH_3$), ethyl (Et, $—CH_2CH_3$), 1-propyl (n-Pr, n-propyl, $—CH_2CH_2CH_3$), 2-propyl (i-Pr, i-propyl, $—CH(CH_3)_2$), cyclopropyl ($—CH_2CH_2CH_2—$), 1-butyl (n-Bu, n-butyl, $—CH_2CH_2CH_2CH_3$), 2-methyl-1-propyl (i-Bu, i-butyl, $—CH_2CH(CH_3)_2$), 2-butyl (s-Bu, s-butyl, $—CH(CH_3)CH_2CH_3$), 2-methyl-2-propyl (t-Bu, t-butyl, $—C(CH_3)_3$), 1-pentyl (n-pentyl, $—CH_2CH_2CH_2CH_2CH_3$), 2-pentyl ($—CH(CH_3)CH_2CH_2CH_3$), 3-pentyl ($—CH(CH_2CH_3)_2$), 2-methyl-2-butyl ($—C(CH_3)_2CH_2CH_3$), 3-methyl-2-butyl ($—CH(CH_3)CH(CH_3)_2$), 3-methyl-1-butyl ($—CH_2CH_2CH(CH_3)_2$), 2-methyl-1-butyl ($—CH_2CH(CH_3)CH_2CH_3$), 1-hexyl ($—CH_2CH_2CH_2CH_2CH_2CH_3$), 2-hexyl ($—CH(CH_3)CH_2CH_2CH_2CH_3$), 3-hexyl ($—CH(CH_2CH_3)(CH_2CH_2CH_3)$), 2-methyl-2-pentyl ($—C(CH_3)_2CH_2CH_2CH_3$), 3-methyl-2-pentyl ($—CH(CH_3)CH(CH_3)CH_2CH_3$), 4-methyl-2-pentyl ($—CH(CH_3)CH_2CH(CH_3)_2$), 3-methyl-3-pentyl ($—C(CH_3)(CH_2CH_3)_2$), 2-methyl-3-pentyl ($—CH(CH_2CH_3)CH(CH_3)_2$), 2,3-dimethyl-2-butyl ($—C(CH_3)_2CH(CH_3)_2$), or 3,3-dimethyl-2-butyl ($—CH(CH_3)C(CH_3)_3$.

According to a specific embodiment of the present disclosure, the metabolic syndrome may include, for example, diabetes, obesity, dyslipidemia, hypertension, hyperinsulinemia, hyperlipidemia, hypertriglyceridemia, arteriosclerosis, and cardiovascular disease, but is not limited thereto.

According to another specific embodiment of the present disclosure, the composition may be a pharmaceutical composition for preventing, ameliorating and/or treating at least one selected from the group consisting of diabetes, obesity, dyslipidemia, hypertension, hyperinsulinemia, hyperlipidemia, hypertriglyceridemia, arteriosclerosis, cardiovascular disease, liver disease [non-alcoholic steatohepatitis (NASH) and non-alcoholic fatty liver disease (NAFLD)], lung disease [non-small cell lung cancer (NSCLC)], breast cancer, and ischemia-reperfusion injury.

According to another specific embodiment of the present disclosure, the composition may be a composition for preventing, ameliorating, or treating liver disease. Specifically, the composition may be a composition for preventing, ameliorating, or treating liver cancer, hepatitis, liver fibrosis, liver cirrhosis, fatty liver, jaundice, and liver failure.

According to another embodiment of the present disclosure, the composition may be a pharmaceutical composition for treating cholestatic disease.

According to another embodiment of the present disclosure, the composition may be a pharmaceutical composition for activating FXR.

The pharmaceutical composition may be a pharmaceutical composition for an individual that may develop metabolic syndrome. Specifically, the individual may mean an animal, and the animal may be a human, cow, horse, pig, dog, sheep, goat, monkey, or cat, but is not limited thereto.

The pharmaceutical compositions of the present disclosure are not limited thereto, but may each be formulated and used in oral dosage forms such as powder remedies, granules, powders, capsules, tablets, aqueous suspensions, n-intermediate tablets (n is 2, 3 or 4), orally disintegrating tablets, sublingual tablets or film tablets and in the forms of external preparations, suppositories, and sterile injection solutions according to conventional methods.

The pharmaceutical compositions of the present disclosure may contain a pharmaceutically acceptable carrier. The pharmaceutically acceptable carrier is not limited, but at least one selected from the group consisting of binders, glydents, disintegrants, excipients, solubilizers, dispersants, stabilizers, suspending agents, colorants and flavoring agents may be used for oral administration. In the case of injections, buffers, preservatives, analgesics, solubilizers, isotonic agents, stabilizers or the like may be mixed and used. In the case of topical administration, bases, excipients, lubricants or preservatives may be mixed and used.

The pharmaceutical compositions of the present disclosure may be mixed with pharmaceutically acceptable carriers as described above and formulated in various ways. For example, for oral administration, the pharmaceutical composition may be prepared in the form of tablets, troches, capsules, elixirs, suspensions, syrups, wafers and the like. In the case of injections, the pharmaceutical composition may be prepared in the form of unit dosage ampoules or multiple dosage forms, and may also be formulated as solutions, suspensions, tablets, capsules, sustained release preparations, and the like.

As suitable carriers, excipients or diluents for formulation, for example, lactose, dextrose, sucrose, sorbitol, mannitol, xylitol, erythritol, maltitol, starch, gum acacia, alginate, gelatin, calcium phosphate, calcium silicate, cellulose, methyl cellulose, microcrystalline cellulose, polyvinylpyrrolidone, water, methyl hydroxybenzoate, propyl hydroxybenzoate, talc, magnesium stearate or mineral oil may be used. The pharmaceutical composition may further contain fillers, anti-aggregating agents, lubricants, wetting agents, flavoring agents, emulsifying agents, preservatives, and the like.

The route of administration of the pharmaceutical compositions according to the present disclosure includes, but is not limited to, oral, intravenous, intramuscular, intra-arterial, intramedullary, intrathecal, intracardiac, transdermal, subcutaneous, intraperitoneal, intranasal, enteral, topical, sublingual or rectal administration. Oral or parenteral administration is preferred.

As used herein, "parenteral administration" includes subcutaneous, intradermal, intravenous, intramuscular, intra-articular, intrasynovial, intracisternal, intrathecal, intralesional and intracranial injection or infusion techniques. The pharmaceutical composition of the present disclosure may also be administered in the form of suppositories for rectal administration.

An effective amount of the pharmaceutical composition of the present disclosure may be administrated per dose. The term "effective amount" refers to an amount sufficient to exert an effect for the purposes of the present disclosure when administered to an individual in need thereof. The effective amount may be appropriately selected by those skilled in the art to which the present disclosure pertains depending on the selected cell or individual. The effective amount may be determined according to factors including the severity of the disease, the patient's age, weight, health, sex, the patient's sensitivity to the drug, the time of administration, the route of administration, the rate of excretion, the treatment period, and the drugs used in combination or simultaneously with the composition used, and other factors well known in the medical field.

Specifically, the effective amount may be to administer an amount in a numerical range indicated by two values selected from the group consisting of 0.000001 mg, 0.00001 mg, 0.00005 mg, 0.0001 mg, 0.0002 mg, 0.0003 mg, 0.0005 mg, 0.001 mg, 0.002 mg, 0.003 mg, 0.005 mg, 0.01 mg, 0.02 mg, 0.03 mg, 0.04 mg, 0.05 mg, 0.07 mg, 0.1 mg, 0.2 mg, 0.3 mg, 0.4 mg, 0.5 mg, 0.6 mg, 0.7 mg, 0.8 mg, 0.9 mg, 1 mg, 2 mg, 3 mg, 4 mg, 5 mg, 6 mg, 7 mg, 8 mg, 9 mg, 10 mg, 15 mg, 20 mg, 30 mg, 40 mg, 50 mg, 60 mg, 70 mg, 80 mg, 90 mg, 100 mg, 200 mg, 300 mg, 400 mg, 500 mg, 600 mg, 700 mg, 800 mg, 900 mg, 1000 mg, 1500 mg, 2000 mg, 3000 mg, 5000 mg and 10000 mg.

The dosage of the composition may be indicated, for example, in two numerical ranges selected from the group consisting of 0.001 mg/kg, 0.002 mg/kg, 0.003 mg/kg, 0.004 mg/kg, 0.005 mg/kg, 0.006 mg/kg, 0.007 mg/kg, 0.008 mg/kg, 0.009 mg/kg, 0.01 mg/kg, 0.02 mg/kg, 0.03 mg/kg, 0.04 mg/kg, 0.05 mg/kg, 0.06 mg/kg, 0.07 mg/kg, 0.08 mg/kg, 0.09 mg/kg, 0.1 mg/kg, 0.2 mg/kg, 0.3 mg/kg, 0.4 mg/kg, 0.5 mg/kg, 0.6 mg/kg, 0.7 mg/kg, 0.8 mg/kg, 0.9 mg/kg, 1.0 mg/kg, 1.5 mg/kg, 2.0 mg/kg, 2.5 mg/kg, 3.0 mg/kg, 3.5 mg/kg, 4.0 mg/kg, 4.5 mg/kg, 5.0 mg/kg, 10 mg/kg, 15 mg/kg, 20 mg/kg, 30 mg/kg, 40 mg/kg, 50 mg/kg, 60 mg/kg, 70 mg/kg, 80 mg/kg, 90 mg/kg, 100 mg/kg, 500 mg/kg and 1000 mg/kg for an adult.

The number of administration may be once a day, multiple times a day, 1, 2, 3, 4, 5 and/or 6 times a week, 1, 2, 3 and/or 4 times a month, or 1 to 12 times a year.

According to the present disclosure, the pharmaceutical composition may further contain other pharmaceutical compositions and the like for metabolic syndrome. Specifically, "other pharmaceutical compositions and the like" may be pharmaceutical compositions, herbal extracts, fractions of the herbal extracts, or medicaments for preventing, ameliorating and/or treating at least one selected from the group consisting of diabetes, obesity, dyslipidemia, hypertension, hyperinsulinemia, hyperlipidemia, hypertriglyceridemia, arteriosclerosis, cardiovascular disease, liver disease [non-alcoholic steatohepatitis (NASH) and non-alcoholic fatty liver disease (NAFLD)], lung disease [non-small cell lung cancer (NSCLC)], breast cancer, and ischemia-reperfusion injury.

According to another embodiment, "other pharmaceutical compositions and the like" may be a composition for preventing, ameliorating, or treating liver disease, may specifically be a composition, an herbal extract, a fraction of the herbal extract, or a medicament for preventing, ameliorating and/or treating liver cancer, hepatitis, liver fibrosis, liver cirrhosis, fatty liver, jaundice, and liver failure.

According to another embodiment, "other pharmaceutical compositions and the like" may be a composition, an herbal extract, a fraction of the herbal extract, or a medicament that activates FXR.

Specifically, the pharmaceutical compositions of the present disclosure and other pharmaceutical compositions and the like may be used at a ratio of, for example, 1:about 0.001 to 1000, for example, 1:about 0.01 to 100, or, for example, 1:about 0.1 to 10 with respect to the active ingredients.

The pharmaceutical composition of the present disclosure may be used singly or in mixture with other pharmaceutical compositions and the like, or may be used concurrently with surgery, radiation therapy, hormone therapy, other chemotherapy, and methods using biological response modifiers.

The composition for preventing, ameliorating and/or treating diabetes includes, but is not limited to, sulfonylurea drugs, biguanide-based antidiabetic agents, alpha-glucosidase inhibitors, thiazolidinedione-based antidiabetic agents, meglitinide-based antidiabetic agents, DPP-4 inhibitors, SGLT-2 inhibitors and the like. The composition for preventing, ameliorating and/or treating obesity includes, but is not limited to, fat absorption inhibitors, appetite suppressants, metabolic stimulants and the like. The composition for preventing, ameliorating and/or treating hypertension includes, but is not limited to, beta-blockers, diuretics, angiotensin-converting enzyme inhibitors, angiotensin II receptor blockers, calcium channel blockers, alpha-blockers, and the like. The drug for hyperlipidemia includes, but is not limited to, statins and the like. The composition for preventing, ameliorating and/or treating cardiovascular disease includes antiplatelet agents, warfarin agents, non-vitamin K antagonist anticoagulants, and the like.

Synthesis of Cinnamic Amide Derivatives

According to a specific embodiment, the cinnamic amide derivatives may be produced by the reaction between a first reactant and a second reactant.

First Reactant

According to an embodiment of the present disclosure, the first reactant may be coumaric acid. The coumaric acid may be para-, meta- and/or ortho-coumaric acid. The coumaric acid may be trans-form and/or cis-form and may be E-form and/or Z-form.

Second Reactant

According to an embodiment of the present disclosure, the second reactant may be an amino acid. The amino acid may be an organic compound having an amino group and a carboxyl group. The amino acid may be glycine, alanine, valine, leucine, isoleucine, threonine, serine, cysteine, methionine, aspartic acid, asgine, glutamic acid, glutamine, lysine, arginine, histidine, phenylalanine, tyrosine, tryptophan, or proline, but is not limited thereto. The amino acid may have a substituent forming an ester bond at the carboxyl terminus.

Third Reactant

According to a specific embodiment, the third reactant may be represented by Chemical Formula 4 or Chemical Formula 5.

[Chem. 4]

[Chem. 5]

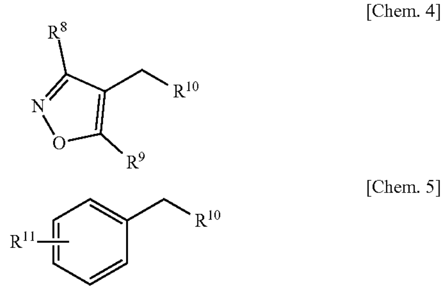

In Chemical Formula 4 and/or 5, $R^8$ may be a substituted or unsubstituted C6 to C14 aryl group or heteroaryl group, $R^9$ may be selected from the group consisting of a C1 to C6 alkyl group, a C1 to C6 alcohol group having 1 to 6 oxygen atoms, a C1 to C6 alkoxy group, a $C_1$ to $C_6$ alkylamine group, a heteroaryl group having 5 to 20 nuclear atoms and a C6 to C20 aryl group, and $R^{10}$ may be a leaving group capable of undergoing a substitution reaction. For example, $R^{10}$ may be a halogen group, a para-toluenesulfonate group, or a methanesulfonate group, but is not limited thereto. More specifically, the halogen group may be fluorine (—F), chlorine (—Cl), bromine (—Br), or iodine (—I).

$R^{11}$ in Chemical Formula 5 may be a substituted or unsubstituted benzyl group or benzoyl group. The substituent with which a benzyl group or benzoyl group is substituted may be at least one selected from the group consisting of a halogen group (X), a nitro group (—$NO_2$), a phenyl group (-Ph), a trifluoromethyl group (—$CF_3$), and a trifluoromethoxy group (—$OCF_3$), and the substituted position may be at least one position selected from positions 2, 3, 4, 5 and 6.

According to an embodiment of the present disclosure, a method for preparing a cinnamic amide derivative may include three steps.

First Step

The reaction may take place by adding the first reactant, the second reactant, and peptide coupling reagents such as trialkylamine, hydroxybenzotriazole, and 1-ethyl-3-(3-dimethylaminopropyl)carbodiimide as a reaction additive. The reaction may be an amide coupling reaction.

The amounts of the respective reactants and reaction additive to be added may be, for example, about 0.01 to 100 equivalents, for example, about 0.01 to 50 equivalents, for example, about 0.01 to 30 equivalents, for example, about 0.01 to 20 equivalents, for example, about 0.01 to 10 equivalents, for example, about 0.01 to 5 equivalents, for example, about 0.01 to 3 equivalents, for example, about 0.01 to 2 equivalents, for example, about 0.01 to 1 equivalent, for example, about 0.1 to 100 equivalents, for example, about 0.1 to 10 equivalents, for example, about 0.1 to 5 equivalents, for example, about 0.1 to 3 equivalents, for example, about 0.1 to 2 equivalents, for example, about 0.1 to 1 equivalent, for example, about 1 to 100 equivalents, for example, about 1 to 50 equivalents, for example, about 1 to 30 equivalents, for example, about 1 to 10 equivalents, for example, about 1 to 5 equivalents, for example, about 1 to 3 equivalents, or, for example, about 1 to 2 equivalents.

The reaction medium may be a solvent, which is a liquid reaction medium that exists as a liquid at the temperature at which the reaction takes place. According to a specific embodiment, the solvent may be a solvent including at least one of 1,4-dioxane, chloroform, methylene chloride, toluene, benzene, or tetrahydrofuran, but is not limited thereto. In particular, it is preferable to select a non-polar solvent as the solvent. Since the reaction uses the principle of securing high selectivity and high yield by the ionic characteristics of the reactants, polar solvents may form a charge-shift bond with the reactants to cancel the ionic characteristics, and this may adversely affect the selectivity and yield.

The reaction may be conducted at between two temperatures selected from the group consisting of 1° C., 2° C., 3° C., 4° C., 5° C., 6° C., 7° C., 8° C., 9° C., 10° C., 15° C., 20° C., 25° C., 30° C., 35° C., 40° C., 45° C., 50° C., 60° C., 70° C., 80° C., 90° C., 100° C., 110° C., 120° C., 130° C., 140° C., 150° C., 160° C., 170° C., 180° C., 190° C., 200° C., 300° C., 400° C. and 500° C.

The reaction may be conducted for a time between two values selected from the group consisting of 0.5 minute, 1 minute, 3 minutes, 5 minutes, 10 minutes, 15 minutes, 20 minutes, 25 minutes, 30 minutes, 35 minutes, 40 minutes, 45 minutes, 50 minutes, 60 minutes, 70 minutes, 80 minutes, 90 minutes, 100 minutes, 150 minutes, 200 minutes, 250 minutes, 300 minutes, 350 minutes, 400 minutes, 450 minutes, 500 minutes, 600 minutes, 700 minutes, 800 minutes, 900 minutes, 1000 minute, and 2000 minutes.

Second Step

The reaction may take place by adding the reaction intermediate produced in the first step, the third reactant, and potassium carbonate and tetrabutylammonium iodide as a reaction additive. The reaction may be Sn2 reaction.

The amounts of the reactant and reaction additive to be added may be, for example, about 0.01 to 100 equivalents, for example, about 0.01 to 50 equivalents, for example, about 0.01 to 30 equivalents, for example, about 0.01 to 20 equivalents, for example, about 0.01 to 10 equivalents, for example, about 0.01 to 5 equivalents, for example, about 0.01 to 3 equivalents, for example, about 0.01 to 2 equivalents, for example, about 0.01 to 1 equivalent, for example, about 0.1 to 100 equivalents, for example, about 0.1 to 10 equivalents, for example, about 0.1 to 5 equivalents, for example, about 0.1 to 3 equivalents, for example, about 0.1 to 2 equivalents, for example, about 0.1 to 1 equivalent, for example, about 1 to 100 equivalents, for example, about 1 to 50 equivalents, for example, about 1 to 30 equivalents, for example, about 1 to 10 equivalents, for example, about 1 to 5 equivalents, for example, about 1 to 3 equivalents, or, for example, about 1 to 2 equivalents.

The reaction medium may be a solvent, which is a liquid reaction medium that exists as a liquid at the temperature at which the reaction takes place. According to a specific embodiment, the solvent may be a solvent including at least one of 1,4-dioxane, chloroform, methylene chloride, toluene, benzene, or tetrahydrofuran, but is not limited thereto. In particular, it is preferable to select a non-polar solvent as the solvent. Since the reaction uses the principle of securing high selectivity and high yield by the ionic characteristics of the reactants, polar solvents may form a charge-shift bond with the reactants to cancel the ionic characteristics, and this may adversely affect the selectivity and yield.

The reaction may be conducted at between two temperatures selected from the group consisting of 1° C., 2° C., 3° C., 4° C., 5° C., 6° C., 7° C., 8° C., 9° C., 10° C., 15° C., 20° C., 25° C., 30° C., 35° C., 40° C., 45° C., 50° C., 60° C., 70° C., 80° C., 90° C., 100° C., 110° C., 120° C., 130° C., 140° C., 150° C., 160° C., 170° C., 180° C., 190° C., 200° C., 300° C., 400° C. and 500° C.

The reaction may be conducted for a time between two values selected from the group consisting of 0.5 minute, 1 minute, 3 minutes, 5 minutes, 10 minutes, 15 minutes, 20 minutes, 25 minutes, 30 minutes, 35 minutes, 40 minutes, 45 minutes, 50 minutes, 60 minutes, 70 minutes, 80 minutes, 90 minutes, 100 minutes, 150 minutes, 200 minutes, 250 minutes, 300 minutes, 350 minutes, 400 minutes, 450 minutes, 500 minutes, 600 minutes, 700 minutes, 800 minutes, 900 minutes, 1000 minute, and 2000 minutes.

Third Step

The third step may be an optional step.

The carboxyl terminus of the reaction intermediate produced in the second step may be hydrolyzed.

Specifically, the reaction intermediate produced in the second step may be hydrolyzed by adding a base such as lithium hydroxide as a reaction additive.

The amounts of the reactant and reaction additive to be added may be, for example, about 0.01 to 100 equivalents, for example, about 0.01 to 50 equivalents, for example, about 0.01 to 30 equivalents, for example, about 0.01 to 20 equivalents, for example, about 0.01 to 10 equivalents, for example, about 0.01 to 5 equivalents, for example, about 0.01 to 3 equivalents, for example, about 0.01 to 2 equivalents, for example, about 0.01 to 1 equivalent, for example, about 0.1 to 100 equivalents, for example, about 0.1 to 10 equivalents, for example, about 0.1 to 5 equivalents, for example, about 0.1 to 3 equivalents, for example, about 0.1 to 2 equivalents, for example, about 0.1 to 1 equivalent, for example, about 1 to 100 equivalents, for example, about 1 to 50 equivalents, for example, about 1 to 30 equivalents, for example, about 1 to 10 equivalents, for example, about 1 to 5 equivalents, for example, about 1 to 3 equivalents, or, for example, about 1 to 2 equivalents.

The reaction may be conducted at between two temperatures selected from the group consisting of 1° C., 2° C., 3° C., 4° C., 5° C., 6° C., 7° C., 8° C., 9° C., 10° C., 15° C., 20° C., 25° C., 30° C., 35° C., 40° C., 45° C., 50° C., 60° C., 70° C., 80° C., 90° C., 100° C., 110° C., 120° C., 130° C., 140° C., 150° C., 160° C., 170° C., 180° C., 190° C., 200° C., 300° C., 400° C. and 500° C.

The reaction may be conducted for a time between two values selected from the group consisting of 0.5 minute, 1 minute, 3 minutes, 5 minutes, 10 minutes, 15 minutes, 20 minutes, 25 minutes, 30 minutes, 35 minutes, 40 minutes, 45 minutes, 50 minutes, 60 minutes, 70 minutes, 80 minutes, 90 minutes, 100 minutes, 150 minutes, 200 minutes, 250 minutes, 300 minutes, 350 minutes, 400 minutes, 450 minutes, 500 minutes, 600 minutes, 700 minutes, 800 minutes, 900 minutes, 1000 minute, and 2000 minutes.

The present disclosure will be illustrated in more detail through the following Examples. However, the present disclosure is not limited by these Examples.

Example 1

Synthesis Method

Para-coumaric acid and glycine ethyl ester are dissolved in dry dichloromethane solvent and EDC-mediated amide coupling reaction is conducted in the presence of EDC, HOBt, and TEA to produce an amide reaction intermediate. This and substituted benzyl halide are subjected to Sn2 reaction in an acetone solvent in the presence of $K_2CO_3$ and TBAI to produce a compound. The compound is hydrolyzed with LiOH to remove the ester bond, whereby a compound is produced.

[Scheme 1]

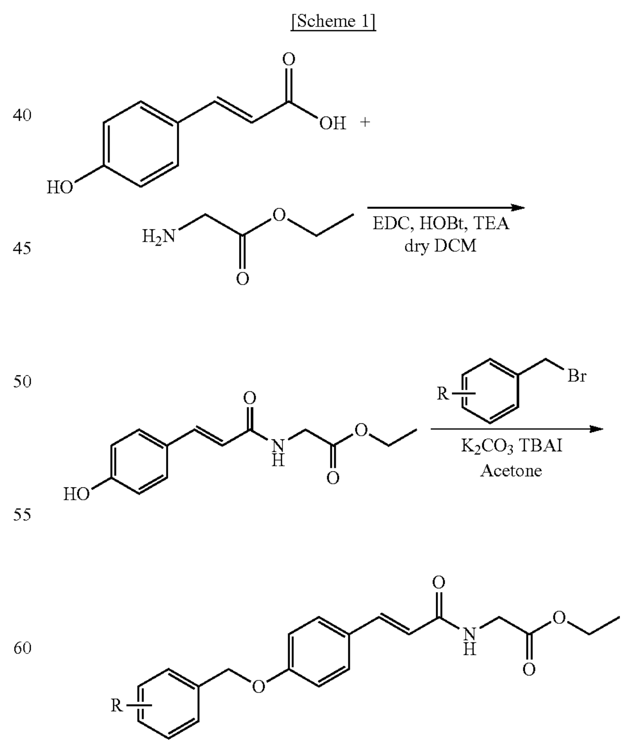

According to this, compounds represented by Chemical Formula 6 and Table 1 are produced.

[Chem. 6]

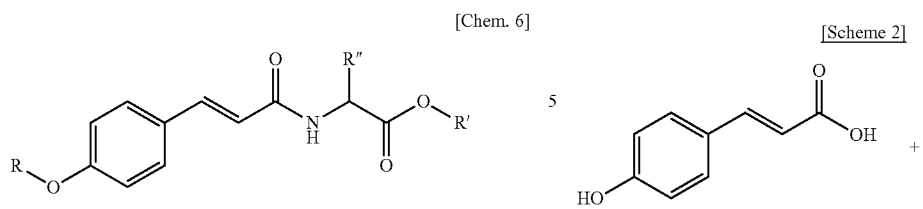

TABLE 1

| Entry | Name | R | R' | R'' | Yield |
|---|---|---|---|---|---|
| KS-001 | ethyl (E)-(3-(4-hydroxyphenyl)acryloyl)glycinate | H | Et | H | 60% |
| KS-002 | ethyl (E)-(3-(4-(benzyloxy)phenyl)acryloyl)glycinate | Bn | Et | H | 79% |
| KS-003 | ethyl (E)-(3-(4-((4-(trifluoromethoxy)benzyl)oxy)phenyl)acryloyl)glycinate | 4-$OCF_3$—Bn | Et | H | 73% |
| KS-004 | ethyl (E)-(3-(4-([1,1'-biphenyl]-4-ylmethoxy)phenyl)acryloyl)glycinate | 4-Ph—Bn | Et | H | 37% |
| KS-005 | ethyl (E)-(3-(4-((4-fluorobenzyl)oxy)phenyl)acryloyl)glycinate | 4-F—Bn | Et | H | 52% |
| KS-006 | ethyl (E)-(3-(4-((4-nitrobenzyl)oxy)phenyl)acryloyl)glycinate | 4-$NO_2$—Bn | Et | H | 46% |
| KS-007 | ethyl (E)-(3-(4-((3-(trifluoromethoxy)benzyl)oxy)phenyl)acryloyl)glycinate | 3-OCF3—Bn | Et | H | 64% |
| KS-008 | ethyl (E)-(3-(4-((3-nitrobenzyl)oxy)phenyl)acryloyl)glycinate | 3-$NO_2$—Bn | Et | H | 52% |
| KS-009 | ethyl (E)-(3-(4-((2,4,5-trifluorobenzyl)oxy)phenyl)acryloyl)glycinate | 2,4,5-triflouoro-Bn | Et | H | 81% |
| KS-013 | (E)-(3-(4-hydroxyphenyl)acryloyl)glycine | H | H | H | 90% |
| KS-014 | (E)-(3-(4-(benzyloxy)phenyl)acryloyl)glycine | Bn | H | H | 92% |
| KS-015 | (E)-(3-(4-((4-(trifluoromethoxy)benzyl)oxy)phenyl)acryloyl)glycine | 4-OCF3—Bn | H | H | 38% |
| KS-016 | (E)-(3-(4-([1,1'-biphenyl]-4-ylmethoxy)phenyl)acryloyl)glycine | 4-Ph—Bn | H | H | 96% |
| KS-017 | (E)-(3-(4-((4-fluorobenzyl)oxy)phenyl)acryloyl)glycine | 4-F—Bn | H | H | 76% |
| KS-018 | (E)-(3-(4-((4-nitrobenzyl)oxy)phenyl)acryloyl)glycine | 4-$NO_2$—Bn | H | H | 78% |
| KS-019 | (E)-(3-(4-((3-(trifluoromethoxy)benzyl)oxy)phenyl)acryloyl)glycine | 3-OCF3—Bn | H | H | 98% |
| KS-020 | (E)-(3-(4-((3-nitrobenzyl)oxy)phenyl)acryloyl)glycine | 3-$NO_2$—Bn | H | H | 98% |
| KS-021 | (E)-(3-(4-((2,4,5-trifluorobenzyl)oxy)phenyl)acryloyl)glycine | 2,4,5-triflouoro-Bn | H | H | 90% |

Para-coumaric acid and an amino acid ester are dissolved in dry dichloromethane solvent and EDC-mediated amide coupling reaction is conducted in the presence of EDC, HOBt, and TEA to produce an amide reaction intermediate. The reaction intermediate thus produced and substituted isoxazole are subjected to Sn2 reaction in an acetone solvent in the presence of $K_2CO_3$ and TBAI to produce a compound. The compound is hydrolyzed with LiOH to remove the ester bond, whereby a compound is produced.

[Scheme 2]

-continued

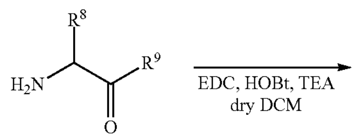

-continued

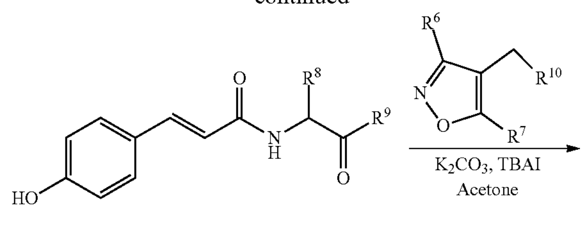

-continued

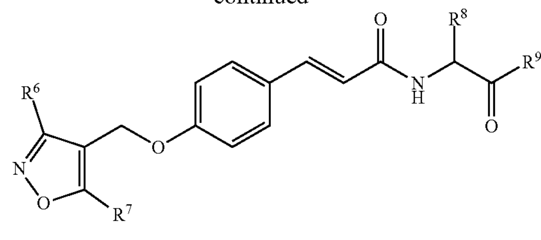

According to this, compounds represented by Chemical Formula 6 and Table 2 are produced.

[Chem. 6]

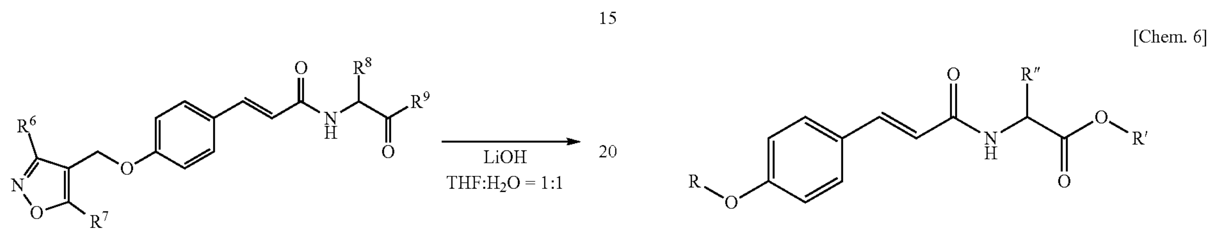

TABLE 2

| Entry | Name | R | R' | R'' | Yield |
|---|---|---|---|---|---|
| KS-010 | ethyl (E)-(3-(4-((3-(2,6-dichlorophenyl)-5-isopropylisoxazol-4-yl)methoxy)phenyl)acryloyl) glycinate | 3-(2,6-Dichlorophenyl)-5-isopropyl-isoxazol-4-methyl | Et | H | 71% |
| KS-011 | ethyl (E)-(3-(4-((3-(2,6-dichlorophenyl)-5-methylisoxazol-4-yl)methoxy)phenyl)acryloyl) glycinate | 3-(2,6-Dichlorophenyl)-5-methyl-isoxazol-4-methyl | Et | H | 86% |
| KS-012 | ethyl (E)-(3-(4-((5-methyl-3-phenylisoxazol-4-yl)methoxy)phenyl)acryloyl) glycinate | 3-phenyl-5-methyl-isoxazol-4-methyl | Et | H | 75% |
| KS-022 | (E)-(3-(4-((3-(2,6-dichlorophenyl)-5-isopropylisoxazol-4-yl)methoxy)phenyl)acryloyl)glycine | 3-(2,6-Dichlorophenyl)-5-isopropyl-isoxazol-4-methyl | H | H | 88% |
| KS-023 | (E)-(3-(4-((3-(2,6-dichlorophenyl)-5-methylisoxazol-4-yl)methoxy)phenyl)acryloyl)glycine | 3-(2,6-Dichlorophenyl)-5-methyl-isoxazol-4-methyl | H | H | 93% |
| KS-024 | (E)-(3-(4-((5-methyl-3-phenylisoxazol-4-yl)methoxy)phenyl)acryloyl)glycine | 3-phenyl-5-methyl-isoxazol-4-methyl | H | H | 96% |
| KS-025 | ethyl (E)-(3-(4-((3-(2,6-dichlorophenyl)-5-isopropylisoxazol-4-yl)methoxy)phenyl)acryloyl)-L-alaninate | 3-(2,6-dichlorophenyl)-5-isopropyl-isoxazole | Et | Me | 79% |
| KS-026 | ethyl (E)-(3-(4-((3-(2,6-dichlorophenyl)-5-methylisoxazol-4-yl)methoxy)phenyl)acryloyl)-L-alaninate | 3-(2,6-dichlorophenyl)-5-methyl-isoxazole | Et | Me | 74% |
| KS-027 | ethyl (E)-(3-(4-((5-methyl-3-phenylisoxazol-4-yl)methoxy)phenyl)acryloyl)-L-alaninate | 3-phenyl-5-methyl-isoxazole | Et | Me | 62% |
| KS-028 | (E)-(3-(4-((3-(2,6-dichlorophenyl)-5-isopropylisoxazol-4-yl)methoxy)phenyl)acryloyl)-L-alanine | 3-(2,6-dichlorophenyl)-5-isopropyl-isoxazole | H | Me | 95% |

TABLE 2-continued

| Entry | Name | R | R' | R" | Yield |
|---|---|---|---|---|---|
| KS-029 | (E)-(3-(4-((3-(2,6-dichlorophenyl)-5-methylisoxazol-4-yl)methoxy)phenyl)acryloyl)-L-alanine | 3-(2,6-dichlorophenyl)-5-methyl-isoxazole | H | Me | 77% |
| KS-030 | (E)-(3-(4-((5-methyl-3-phenylisoxazol-4-yl)methoxy)phenyl)acryloyl)-L-alanine | 3-phenyl-5-methyl-isoxazole | H | Me | 63% |
| KS-031 | ethyl (E)-(3-(4-((3-(2,6-dichlorophenyl)-5-isopropylisoxazol-4-yl)methoxy)phenyl)acryloyl)-L-alanine | 3-(2,6-dichlorophenyl)-5-isopropyl-isoxazole | Et | i-pr | 80% |
| KS-032 | ethyl (E)-(3-(4-((3-(2,6-dichlorophenyl)-5-methylisoxazol-4-yl)methoxy)phenyl)acryloyl)-L-valinate | 3-(2,6-dichlorophenyl)-5-methyl-isoxazole | Et | i-pr | 78% |
| KS-033 | ethyl (E)-(3-(4-((5-methyl-3-phenylisoxazol-4-yl)methoxy)phenyl)acryloyl)-L-valinate | 3-phenyl-5-methyl-isoxazole | Et | i-pr | 89% |
| KS-034 | (E)-(3-(4-((3-(2,6-dichlorophenyl)-5-isopropylisoxazol-4-yl)methoxy)phenyl)acryloyl)-L-valine | 3-(2,6-dichlorophenyl)-5-isopropyl-isoxazole | H | i-pr | 90% |
| KS-035 | (E)-(3-(4-((3-(2,6-dichlorophenyl)-5-methylisoxazol-4-yl)methoxy)phenyl)acryloyl)-L-valine | 3-(2,6-dichlorophenyl)-5-methyl-isoxazole | H | i-pr | 50% |
| KS-036 | (E)-(3-(4-((5-methyl-3-phenylisoxazol-4-yl)methoxy)phenyl)acryloyl)-L-valine | 3-phenyl-5-methyl-isoxazole | H | i-pr | 96% |
| KS-037 | methyl (E)-(3-(4-((3-(2,6-dichlorophenyl)-5-isopropylisoxazol-4-yl)methoxy)phenyl)acryloyl)-L-phenylalaninate | 3-(2,6-dichlorophenyl)-5-isopropyl-isoxazole | Me | Bn | 73% |
| KS-038 | methyl (E)-(3-(4-((3-(2,6-dichlorophenyl)-5-methylisoxazol-4-yl)methoxy)phenyl)acryloyl)-L-phenylalaninate | 3-(2,6-dichlorophenyl)-5-methyl-isoxazole | Me | Bn | 54% |
| KS-039 | methyl (E)-(3-(4-((5-methyl-3-phenylisoxazol-4-yl)methoxy)phenyl)acryloyl)-L-phenylalaninate | 3-phenyl-5-methyl-isoxazole | Me | Bn | 83% |
| KS-040 | (E)-(3-(4-((3-(2,6-dichlorophenyl)-5-isopropylisoxazol-4-yl)methoxy)phenyl)acryloyl)-L-phenylalanine | 3-(2,6-dichlorophenyl)-5-isopropyl-isoxazole | H | Bn | 98% |
| KS-041 | (E)-(3-(4-((3-(2,6-dichlorophenyl)-5-methylisoxazol-4-yl)methoxy)phenyl)acryloyl)-L-phenylalanine | 3-(2,6-dichlorophenyl)-5-methyl-isoxazole | H | Bn | 72% |
| KS-042 | (E)-(3-(4-((5-methyl-3-phenylisoxazol-4-yl)methoxy)phenyl)acryloyl)-L-phenylalanine | 3-phenyl-5-methyl-isoxazole | H | Bn | 83% |
| KS-043 | methyl (E)-3-(3-(4-((3-(2,6-dichlorophenyl)-5-isopropylisoxazol-4-yl)methoxy)phenyl)acrylamido)propanoate | 3-(2,6-dichlorophenyl)-5-isopropyl-isoxazole | Me | H | 75% |
| KS-044 | methyl (E)-3-(3-(4-((3-(2,6-dichlorophenyl)-5-methylisoxazol-4-yl)methoxy)phenyl)acrylamido)propanoate | 3-(2,6-dichlorophenyl)-5-methyl-isoxazole | Me | H | 78% |
| KS-045 | methyl (E)-3-(3-(4-((5-methyl-3-phenylisoxazol-4-yl)methoxy)phenyl)acrylamido)propanoate | 3-phenyl-5-methyl-isoxazole | Me | H | 78% |
| KS-046 | (E)-3-(3-(4-((3-(2,6-dichlorophenyl)-5-isopropylisoxazol-4-yl)methoxy)phenyl)acrylamido)propanoic acid | 3-(2,6-dichlorophenyl)-5-isopropyl-isoxazole | H | H | 96% |

TABLE 2-continued

| Entry | Name | R | R' | R" | Yield |
|---|---|---|---|---|---|
| KS-047 | (E)-3-(3-(4-((3-(2,6-dichlorophenyl)-5-methylisoxazol-4-yl)methoxy)phenyl)acrylamido)propanoic acid | 3-(2,6-dichlorophenyl)-5-methyl-isoxazole | H | H | 87% |
| KS-048 | (E)-3-(3-(4-((5-methyl-3-phenylisoxazol-4-yl)methoxy)phenyl)acrylamido)propanoic acid | 3-phenyl-5-methyl-isoxazole | H | H | 82% |
| KS-049 | methyl (E)-(3-(4-((3-(2,6-dichlorophenyl)-5-isopropylisoxazol-4-yl)methoxy)phenyl)acryloyl)-D-alaninate | 3-(2,6-dichlorophenyl)-5-isopropyl-isoxazole | Me | Me | 71% |
| KS-050 | methyl (E)-(3-(4-((3-(2,6-dichlorophenyl)-5-methylisoxazol-4-yl)methoxy)phenyl)acryloyl)-D-alaninate | 3-(2,6-dichlorophenyl)-5-methyl-isoxazole | Me | Me | 69% |
| KS-051 | methyl (E)-(3-(4-((5-methyl-3-phenylisoxazol-4-yl)methoxy)phenyl)acryloyl)-D-alaninate | 3-phenyl-5-methyl-isoxazole | Me | Me | 83% |
| KS-052 | (E)-(3-(4-((3-(2,6-dichlorophenyl)-5-isopropylisoxazol-4-yl)methoxy)phenyl)acryloyl)-D-alanine | 3-(2,6-dichlorophenyl)-5-isopropyl-isoxazole | H | Me | 96% |
| KS-053 | (E)-(3-(4-((3-(2,6-dichlorophenyl)-5-methylisoxazol-4-yl)methoxy)phenyl)acryloyl)-D-alanine | 3-(2,6-dichlorophenyl)-5-methyl-isoxazole | H | Me | 97% |
| KS-054 | (E)-(3-(4-((5-methyl-3-phenylisoxazol-4-yl)methoxy)phenyl)acryloyl)-D-alanine | 3-phenyl-5-methyl-isoxazole | H | Me | 99% |

The analysis data for each derivative is as presented in Table 3.

TABLE 3

| KS-001 |
|---|
| $^1$H NMR (400 MHz, $CD_3OD$) δ 7.48 (d, J = 15.7 Hz, 1H), 7.41 (d, J = 8.4 Hz, 2H), 6.79 (d, J = 8.6 Hz, 2H), 6.47 (d, J = 15.7 Hz, 1H), 4.19 (q, J = 7.1 Hz, 2H), 4.03 (s, 2H), 1.26 (t, J = 7.1 Hz, 3H). |
| KS-002 |
| $^1$H NMR (400 MHz, $CD_3OD$) δ 7.49 (m, 3H), 7.41 (d, J = 7.4 Hz, 2H), 7.35 (t, J = 7.3 Hz, 2H), 7.29 (d, J = 7.2 Hz, 1H), 6.99 (d, J = 8.8 Hz, 2H), 6.51 (d, J = 15.8 Hz, 1H), 5.09 (s, 2H), 4.17 (q, J = 7.1 Hz, 2H), 4.01 (s, 2H), 1.25 (t, J = 7.1 Hz, 3H). |
| KS-003 |
| $^1$H NMR (400 MHz, $CD_3OD$) δ 7.52 (m, 5H), 7.27 (d, J = 8.8 Hz, 2H), 7.01 (d, J = 8.8 Hz, 2H), 6.52 (d, J = 15.8 Hz, 1H), 5.13 (s, 2H), 4.18 (q, J = 7.1 Hz, 2H), 4.02 (s, 2H), 1.26 (t, J = 7.1 Hz, 3H). |
| KS-004 |
| $^1$H NMR (400 MHz, $CDCl_3$) δ 7.61 (m, 5H), 7.47 (m, 6H), 7.36 (t, 1H), 6.99 (d, J = 8.53 Hz, 2H), 6.34 (d, J = 15.6 Hz, 1H), 6.10 (t, J = 4.8 Hz, 1H) 5.13 (s, 2H), 4.25 (q, J = 7.1 Hz, 2H), 4.17(d, J = 4.9 Hz, 2H), 1.31 (t, J = 7.1 Hz, 3H) |
| KS-005 |
| $^1$H NMR (400 MHz, $CDCl_3$) δ 7.60 (d, J = 15.6 Hz, 1H), 7.46 (d, J = 8.7 Hz, 2H), 7.40 (dd, J = 8.5, 5.4 Hz, 2H), 7.08 (t, J = 8.7 Hz, 2H), 6.95 (d, J = 8.7 Hz, 2H), 6.34 (d, J = 15.6 Hz, 1H), 6.10 (s, 1H), 5.04 (s, 2H), 4.25 (q, J = 7.1 Hz, 2H), 4.17 (d, J = 5.0 Hz, 2H), 1.31 (t, J = 7.1 Hz, 3H). |
| KS-006 |
| $^1$H NMR (400 MHz, $CDCl_3$) δ 8.26 (d, J = 8.8 Hz, 2H), 7.61 (m, 3H), 7.48 (d, J = 8.8 Hz, 2H), 6.96 (d, J = 8.8 Hz, 2H), 6.35 (d, J = 15.6 Hz, 1H), 6.09 (t, J = 4.9 Hz, 1H), 5.20 (s, 2H), 4.25 (q, J = 7.1 Hz, 2H), 4.15 (d, J = 5.1 Hz, 2H), 1.28 (t, J = 7.1 Hz, 3H). |

TABLE 3-continued

| KS-007 |
|---|
| $^1$H NMR (400 MHz, $CDCl_3$) δ 7.61 (d, J = 15.6 Hz, 1H), 7.47 (d, J = 8.7 Hz, 2H), 7.42 (t, J = 7.8 Hz, 1H), 7.35 (d, J = 7.8 Hz, 1H), 7.30 (s, 1H), 7.19 (d, J = 7.8 Hz, 1H), 6.96 (d, J = 8.7 Hz, 2H), 6.34 (d, J = 15.6 Hz, 1H,), 6.10 (t, J = 4.9 Hz, 1H), 5.10 (s, 2H), 4.25 (q, J = 7.2 Hz, 2H), 4.17 (d, J = 5.1 Hz, 2H), 1.31 (t, J = 7.1 Hz, 3H). |
| KS-008 |
| $^1$H NMR (400 MHz, $CDCl_3$) δ 8.32 (s, 1H), 8.19 (m, 1H), 7.76 (d, J = 7.6 Hz, 1H), 7.59, (m, 2H), 7.46 (d, J = 8.8 Hz, 2H), 6.96 (d, J = 8.7 Hz, 2H), 6.36 (d, J = 15.6 Hz, 1H), 6.20 (t, J = 4.8 Hz, 1H), 5.17 (s, 2H), 4.24 (q, J = 7.1 Hz, 2H), 4.17 (d, J = 5.1 Hz, 2H), 1.30 (t, J = 7.1 Hz, 3H). |
| KS-009 |
| $^1$H NMR (400 MHz, $CDCl_3$) δ 7.60 (d, J = 15.6 Hz, 1H), 7.47 (d, J = 8.7 Hz, 2H), 7.34 (m, 1H), 6.96 (m, 3H), 6.35 (d, J = 15.6 Hz, 1H), 6.17 (t, J = 4.8 Hz, 1H), 5.08 (s, 2H), 4.25 (q, J = 7.1 Hz, 2H), 4.17 (d, J = 5.1 Hz, 2H), 1.30 (t, J = 7.1 Hz, 3H). |
| KS-010 |
| 1H NMR (400 MHz, $CD_3OD$) δ 7.45 (m, 6H), 6.77 (d, J = 8.8 Hz, 2H), 6.48 (d, J = 15.7 Hz, 1H), 4.82 (s, 2H), 4.17 (q, J = 7.1 Hz, 2H), 4.01 (s, 2H), 3.39 (h, J = 6.9 Hz, 1H), 1.39 (d, J = 7.0 Hz, 6H), 1.25 (t, J = 7.1 Hz, 3H) |
| KS-011 |
| 1H NMR (400 MHz, $CDCl_3$) δ 7.56 (d, J = 15.6 Hz, 1H), 7.39 (m, 4H), 7.32 (dd, J = 7.0 Hz, 1H), 6.76 (d, J = 8.7 Hz, 2H), 6.31 (d, J = 15.6 Hz, 1H), 6.09 (t, J = 4.5 Hz, 1H), 4.75 (s, 2H), 4.24 (q, J = 7.1 Hz, 2H), 4.16 (d, J = 5.1 Hz, 2H), 2.56 (s, 3H), 1.30 (t, J = 7.1 Hz, 3H) |
| KS-012 |
| 1H NMR (400 MHz, $CDCl_3$) δ 7.68 (m, 2H), 7.61 (d, J = 15.6 Hz, 1H), 7.47 (d, J = 8.8 Hz, 2H), 7.43 (m, 3H), 6.94 (d, J = 8.8 Hz, 2H), 6.37 (d, J = 15.6 Hz, 1H), 6.23 (t, J = 5.0 Hz, 1H), 4.86 (s, 2H), 4.24 (q, J = 7.1 Hz, 2H), 4.17 (d, J = 5.1 Hz, 2H), 2.50 (s, 3H), 1.30 (t, J = 7.1 Hz, 3H) |
| KS-013 |
| 1H NMR (400 MHz, $CD_3OD$) δ 7.46 (d, J = 15.7 Hz, 1H), 7.40 (d, J = 8.7 Hz, 2H), 6.77 (d, J = 8.7 Hz, 2H), 6.47 (d, J = 15.7 Hz, 1H), 3.99 (s, 2H). |
| KS-014 |
| 1H NMR (400 MHz, $CD_3OD$) δ 7.48 (m, 3H), 7.41 (d, J = 7.4 Hz, 2H), 7.34 (t, J = 7.2 Hz, 2H), 7.29 (t, J = 7.1 Hz, 1H), 6.99 (d, J = 8.8 Hz, 2H), 6.51 (d, J = 15.8 Hz, 1H), 5.09 (s, 2H), 3.99 (s, 2H). |
| KS-015 |
| 1H NMR (400 MHz, DMSO-$d_6$) δ 8.30 (t, J = 5.7 Hz, 1H), 7.53 (d, J = 8.8 Hz, 2H), 7.46 (d, J = 7.6 Hz, 2H), 7.40 (m, 2H), 7.37 (m, 1H), 7.34 (m, 1H), 7.06 (d, J = 8.8 Hz, 2H), 6.57 (d, J = 15.8 Hz, 1H), 5.15 (s, 2H), 3.86 (d, J = 5.9 Hz, 2H). |
| KS-016 |
| 1H NMR (400 MHz, DMSO-$d_6$) δ 8.33 (t, J = 6.0 Hz, 1H), 7.68 (m, 4H), 7.54 (m, 2H), 7.47 (t, J = 6.0 Hz, 2H), 7.39 (m, 2H), 7.08 (d, J = 8.8 Hz, 2H), 6.57 (d, J = 15.8 Hz, 1H), 5.20 (s, 2H), 3.87 (d, J = 5.9 Hz, 2H). |
| KS-017 |
| 1H NMR (400 MHz, Acetone-$d_6$) δ 7..54 (m, 5H), 7.17 (t, J = 8.8 Hz, 2H), 7.04 (d, J = 8.7 Hz, 2H), 6.67 (d, J = 15.7 Hz, 1H), 5.15 (s, −2H), 4.08 (s, 2H). |
| KS-018 |
| 1H NMR (400 MHz, DMSO-$d_6$) δ 12.60 (s, 1H), 8.34 (t, J = 5.6 Hz, 1H), 8.27 (d, J = 8.8 Hz, 2H), 7.73 (d, J = 8.8 Hz, 2H), 7.55 (d, J = 8.7 Hz, 2H), 7.40 (d, J = 15.8 Hz, 1H), 7.08 (d, J = 8.7 Hz, 2H), 6.58 (d, J = 15.8 Hz, 1H), 5.34 (s, 2H), 3.87 (d, J = 5.9 Hz, 2H), 1.23 (s, 2H). |
| KS-019 |
| 1H NMR (400 MHz, DMSO-$D_6$) δ 8.31 (t, J = 5.9 Hz, 1H), 7.53 (m, J = 7.6 Hz, 4H), 7.45 (s, 1H), 7.39 (d, J = 15.8 Hz, 1H), 7.34 (d, J = 7.9 Hz, 1H), 7.07 (d, J = 8.8 Hz, 2H), 6.58 (d, J = 15.8 Hz, 1H), 5.21 (s, 2H), 3.87 (d, J = 5.9 Hz, 2H). |
| KS-020 |
| 1H NMR (400 MHz, $CD_3OD$) δ 8.30 (s, 1H), 8.16 (d, J = 8.2 Hz, 1H), 7.82 (d, J = 7.6 Hz, 2H), 7.60 (t, J = 8.0 Hz, 1H), 7.49 (m, 3H), 7.02 (d, J = 8.8 Hz, 2H) 6.52 (d, J = 15.8 Hz, 1H), 5.22 (s, 2H), 4.00 (s, 2H). |

TABLE 3-continued

| KS-021 |
| --- |
| 1H NMR (400 MHz, $CD_3OD$) δ 7.47 (m, 4H), 7.18 (m, 1H), 6.99 (d, J = 8.8 Hz, 2H), 6.52 (d, J = 15.8 Hz, 1H), 5.08 (s, 2H), 3.99 (s, 2H) |
| KS-022 |
| 1H NMR (400 MHz, $CD_3OD$) δ 7.44 (m, 3H), 7.38 (m, 4H), 6.73 (d, J = 8.7 Hz, 2H), 6.45 (d, J = 15.7 Hz, 1H), 4.79 (s, 2H), 3.99 (s, 1H), 3.68 (s, 1H), 3.36 (hept, J = 7.0 Hz, 1H), 3.29 (s, 1H), 1.35 (d, J = 7.0 Hz, 6H). |
| KS-023 |
| 1H NMR (400 MHz, $CD_3OD$) δ 7.44 (m, 7H), 6.73 (d, J = 8.5 Hz, 2H), 6.45 (dd, J = 15.7, 4.0 Hz, 1H), 4.79 (s, 2H), 3.98 (d, J = 9.4 Hz, 2H), 2.52 (s, 3H). |
| KS-024 |
| 1H NMR (400 MHz, $CD_3OD$) δ 7.64 (m, 2H), 7.49 (m, 3H), 7.42 (m, 3H), 6.97 (d, J = 8.8 Hz, 2H), 6.53 (d, J = 15.8 Hz, 1H), 4.93 (s, 2H), 4.00 (s, 2H), 2.48 (s, 3H). |
| KS-025 |
| 1H NMR (400 MHz, $CDCl_3$) δ 7.53 (d, J = 15.6 Hz, 1H), 7.38 (m, 4H), 7.31 (m, 1H), 6.75 (d, J = 8.8 Hz, 2H), 6.28 (m, 2H), 4.73 (s, 2H), 4.22 (q, J = 7.1 Hz, 2H), 3.31 (h, J = 7.0 Hz, 1H), 1.45 (d, J = 7.1 Hz, 3H), 1.41 (d, J = 7.0 Hz, 6H), 1.29 (t, J = 7.1 Hz, 3H); |
| KS-026 |
| 1H NMR (400 MHz, Chloroform-d) δ 7.54 (d, J = 15.6 Hz, 1H), 7.41-7.36 (m, 4H), 7.32 (dd, J = 9.0, 6.9 Hz, 1H), 6.76 (d, J = 8.7 Hz, 2H), 6.28 (d, J = 15.6 Hz, 1H), 6.19 (d, J = 7.4 Hz, 1H), 4.75 (s, 2H), 4.70 (m, 1H) 4.22 (t, J = 7.1 Hz, 2H), 2.56 (s, 3H), 1.46 (d, J = 7.1 Hz, 3H), 1.30 (t, J = 7.1 Hz, 3H). |
| KS-027 |
| 1H NMR (400 MHz, Chloroform-d) δ 7.69 (m, 2H), 7.60 (d, J = 14.7 Hz, 1H), 7.44 (m, 5H), 6.94 (d, J = 7.6 Hz, 2H), 6.35 (d, J = 15.1 Hz, 1H), 6.27 (s, 1H), 5.30 (s, 1H), 4.87 (s, 2H), 4.73 (s, 1H), 4.23 (q, J = 7.1 Hz, 2H), 2.51 (s, 3H), 1.48 (d, J = 6.6 Hz, 3H), 1.30 (t, J = 7.1 Hz, 3H). |
| KS-028 |
| 1H NMR (400 MHz, DMSO-$d_6$) δ 8.26 (d, J = 7.3 Hz, 1H), 7.58 (m, 2H), 7.49 (dd, J = 9.1, 7.0 Hz, 1H), 7.38 (d, J = 8.8 Hz, 2H), 7.28 (d, J = 15.7 Hz, 1H), 6.77 (d, J = 8.8 Hz, 2H), 6.48 (d, J = 15.8 Hz, 1H), 4.80 (s, 2H), 4.25 (p, J = 7.3 Hz, 1H), 1.28 (d, J = 7.0 Hz, 6H), 1.25 (d, J = 7.3 Hz, 3H). |
| KS-029 |
| 1H NMR (400 MHz, DMSO-$d_6$) δ 8.26 (d, J = 7.5, 1H), 7.60-7.57 (m, 2H), 7.50 (dd, J = 9.1, 7.0 Hz, 1H), 7.39 (d, J = 8.8 Hz, 2H), 7.30 (d, J = 15.8 Hz, 1H), 6.78 (d, J = 8.8 Hz, 2H), 6.49 (d, J = 15.8 Hz, 1H), 4.82 (s, 2H), 4.27 (p, J = 7.3 Hz, 1H), 2.55 (s, 3H), 1.27 (d, J = 7.3 Hz, 3H). |
| KS-030 |
| 1H NMR (400 MHz, DMSO-$d_6$) δ 8.30 (d, J = 7.3 Hz, 1H), 7.65 (dd, J = 6.7, 3.0 Hz, 2H), 7.51-7.43 (m, 5H), 7.35 (d, J = 15.8 Hz, 1H), 7.02 (d, J = 8.8 Hz, 2H), 6.53 (d, J = 15.8 Hz, 1H), 4.97 (s, 2H), 4.28 (p, J = 7.3 Hz, 1H), 2.48 (s, 3H), 1.27 (d, J = 7.3 Hz, 3H) |
| KS-031 |
| 1H NMR (400 MHz, $CDCl_3$) δ 7.55 (d, J = 15.6 Hz, 1H), 7.39 (m, 4H), 7.39 (m, 1H), 6.76 (d, J = 8.7 Hz, 2H), 6.32 (d, J = 15.5 Hz, 1H), 6.12 (d, J = 8.8 Hz, 1H), 4.74 (s, 2H), 4.70 (dd, J = 8.8, 4.8 Hz, 1H), 4.22 (qq, J = 7.0, 3.7 Hz, 2H), 3.31 (h, J = 7.0 Hz, 1H), 2.22 (m, 1H), 1.41 (d, J = 7.0 Hz, 6H), 1.29 (t, J = 7.1 Hz, 3H), 0.96 (dd, J = 13.4, 6.9 Hz, 6H). |
| KS-032 |
| 1H NMR (400 MHz, $CDCl_3$) δ 7.55 (d, J = 15.6 Hz, 1H), 7.39 (m, 4H), 7.32 (m, 1H), 6.76 (d, J = 8.8 Hz, 2H), 6.32 (d, J = 15.5 Hz, 1H), 6.12 (d, J = 8.8 Hz, 1H), 4.74 (s, 2H), 4.70 (dd, J = 8.8, 4.8 Hz, 1H), 4.21 (qd, J = 7.1, 3.1 Hz, 2H), 2.56 (s, 3H), 2.22 (m, 1H), 1.29 (t, J = 7.1 Hz, 3H), 0.96 (dd, J = 13.6, 6.9 Hz, 6H). |
| KS-033 |
| 1H NMR (400 MHz, Chloroform-d) δ 7.71-7.67 (m, 2H), 7.61 (d, J = 15.6 Hz, 1H), 7.48 (d, J = 8.7 Hz, 2H), 7.44 (dd, J = 5.2, 2.0 Hz, 3H), 6.95 (d, J = 8.8 Hz, 2H), 6.37 (d, J = 15.5 Hz, 1H), 6.12 (d, J = 8.8 Hz, 1H), 4.87 (s, 2H), 4.72 (dd, J = 8.8, 4.8 Hz, 1H), 4.23 (qd, J = 7.1, 2.8 Hz, 2H), 2.51 (s, 3H), 2.24 (pd, J = 6.9, 4.9 Hz, 1H), 1.30 (t, J = 7.1 Hz, 3H), 0.97 (dd, J = 13.9, 6.9 Hz, 6H) |

TABLE 3-continued

| KS-034 |
|---|
| 1H NMR (400 MHz, DMSO-$d_6$) δ 8.11 (d, J = 8.6 Hz, 1H), 7.62 (dd, J = 8.1, 0.9 Hz, 2H), 7.56-7.52 (m, 1H), 7.43 (d, J = 8.8 Hz, 2H), 7.33 (d, J = 15.7 Hz, 1H), 6.83 (d, 2H), 6.69 (d, J = 15.8 Hz, 1H), 4.85 (d, 2H), 4.27 (dd, J = 8.5, 5.6 Hz, 1H), 3.45 (hept, J = 7.0 Hz, 1H) 2.09 (hept, J = 6.8 Hz, 1H), 1.33 (d, J = 7.0 Hz, 6H), 0.90 (dd, J = 6.8, 2.6 Hz, 6H). |
| KS-035 |
| 1H NMR (400 MHz, DMSO-$d_6$) δ 8.06 (d, J = 8.6 Hz, 1H), 7.57-7.53 (m, 2H), 7.47 (dd, J = 9.1, 7.0 Hz, 1H), 7.37 (d, J = 8.8 Hz, 2H), 7.27 (d, J = 15.7 Hz, 1H), 6.75 (d, J = 8.8 Hz, 2H), 6.63 (d, J = 15.8 Hz, 1H), 4.79 (s, 2H), 4.20 (dd, J = 8.6, 5.6 Hz, 1H), 2.52 (s, 3H), 2.04 (m, 1H), 0.84 (dd, J = 6.8, 2.5 Hz, 6H). |
| KS-036 |
| 1H NMR (400 MHz, DMSO-$d_6$) δ 8.09 (d, J = 8.6 Hz, 1H), 7.64 (dd, J = 6.6, 3.0 Hz, 2H), 7.46 (m, 5H), 7.34 (d, J = 15.8 Hz, 1H), 7.01 (d, J = 8.7 Hz, 2H), 6.69 (d, J = 15.8 Hz, 1H), 4.97 (s, 2H), 4.23 (dd, J = 8.5, 5.7 Hz, 1H), 2.48 (s, 3H), 2.05 (m, 1H), 0.86 (dd, J = 6.8, 2.4 Hz, 6H) |
| KS-037 |
| 1H NMR (400 MHz, Chloroform-d) δ 7.55 (d, J = 15.6 Hz, 1H), 7.33 (m, 10H), 7.10 (d, J = 6.5 Hz, 2H), 6.75 (d, J = 8.7 Hz, 2H), 6.23 (d, J = 15.6 Hz, 1H), 6.01 (d, J = 7.7 Hz, 1H), 5.03 (m, 1H), 4.74 (s, 2H), 3.75 (s, 3H), 3.33 (h, J = 6.9 Hz, 1H), 3.20 (m, 2H), 1.42 (d, J = 7.0 Hz, 6H). |
| KS-038 |
| 1H NMR (400 MHz, Chloroform-d) δ 7.55 (d, J = 15.6 Hz, 1H), 7.34 (m, 8H), 7.10 (dd, J = 7.8, 1.5 Hz, 2H), 6.76 (d, J = 8.8 Hz, 2H), 6.24 (d, J = 15.6 Hz, 1H), 6.03 (d, J = 7.8 Hz, 1H), 5.03 (m, 1H), 4.75 (s, 2H), 3.75 (s, 3H), 3.20 (m, 2H), 2.56 (s, 3H). |
| KS-039 |
| 1H NMR (400 MHz, Chloroform-d) δ 7.69 (m, 2H), 7.60 (d, J = 15.6 Hz, 1H), 7.45 (m, 6H), 7.29 (m, 3H), 7.12 (m, 2H), 6.94 (d, J = 8.8 Hz, 2H), 6.29 (d, J = 15.6 Hz, 1H), 6.07 (d, J = 7.6 Hz, 1H), 5.04 (m, 1H), 4.87 (s, 2H), 3.76 (s, 3H), 3.21 (m, 2H), 2.51 (s, 3H). |
| KS-040 |
| 1H NMR (400 MHz, DMSO-$d_6$) δ 8.32 (d, J = 8.1 Hz, 1H), 7.62 (m, 2H), 7.54 (m, 1H), 7.41 (d, J = 8.8 Hz, 2H), 7.26 (m, 6H), 6.81 (d, J = 8.8 Hz, 2H), 6.52 (d, J = 15.8 Hz, 1H), 4.85 (s, 2H), 4.55 (m, 1H), 3.45 (hept, J = 7.0 Hz, 1H), 3.01 (m, 2H), 1.33 (d, J = 7.0 Hz, 6H). |
| KS-041 |
| 1H NMR (400 MHz, DMSO-$d_6$) δ 8.29 (d, J = 8.1 Hz, 1H), 7.57 (d, J = 8.1, 2H), 7.49 (dd, J = 9.1, 7.0 Hz, 1H), 7.37 (d, J = 8.8 Hz, 2H), 7.21 (m, 6H), 6.75 (d, J = 8.8 Hz, 2H), 6.46 (d, J = 15.8 Hz, 1H), 4.80 (s, 2H), 4.50 (m, 1H), 3.96 (m, 2H), 2.53 (s, 3H). |
| KS-042 |
| 1H NMR (400 MHz, DMSO-$d_6$) δ 8.50 (d, J = 7.8 Hz, 1H), 7.69 (m, 2H), 7.50 (m, 5H), 7.36 (d, J = 15.7 Hz, 1H), 7.26 (m, 5H), 7.05 (d, J = 8.7 Hz, 2H), 6.55 (d, J = 15.8 Hz, 1H), 5.01 (s, 2H), 4.61 (m, 1H), 3.02 (m, 2H), 2.53 (s, 3H). |
| KS-043 |
| 1H NMR (400 MHz, Chloroform-d) δ 7.52 (d, J = 15.6 Hz, 1H), 7.38 (m, 4H), 7.31 (dd, J = 9.1, 7.0 Hz, 1H), 6.75 (d, J = 8.8 Hz, 2H), 6.21 (d, J = 15.6 Hz, 2H), 4.73 (s, 2H), 3.71 (s, 3H), 3.63 (q, J = 6.1 Hz, 2H), 3.32 (hept, J = 7.1 Hz, 1H), 2.61 (t, 2H), 1.41 (d, J = 7.0, 6H). |
| KS-044 |
| 1H NMR (400 MHz, Chloroform-d) δ 7.52 (d, J = 15.6 Hz, 1H), 7.39 (m, 4H), 7.31 (m, 1H), 6.75 (d, J = 8.6 Hz, 2H), 6.22 (m, 2H), 4.74 (s, 2H), 3.70 (s, 3H), 3.63 (q, J = 6.0 Hz, 2H), 2.61 (t, J = 5.9 Hz, 2H), 2.55 (s, 3H). |
| KS-045 |
| 1H NMR (400 MHz, Chloroform-d) δ 7.68 (m, 2H), 7.58 (d, J = 15.6 Hz, 1H), 7.44 (m, 5H), 6.93 (d, J = 8.7 Hz, 2H), 6.28 (m, Ar-H, 2H), 4.86 (s, 2H), 3.71 (s, 3H), 3.65 (q, J = 6.0 Hz, 2H), 2.62 (t, J = 5.9 Hz, 2H), 2.50 (s, 3H). |
| KS-046 |
| 1H NMR (400 MHz, Methanol-$d_4$) δ 7.47 (m, 2H), 7.39 (m, 5H), 6.75 (d, J = 8.8 Hz, 2H), 6.40 (d, J = 15.8 Hz, 1H), 4.80 (s, 2H), 3.50 (t, J = 6.7 Hz, 2H), 3.38 (p, J = 7.0 Hz, 1H), 2.53 (t, J = 6.7 Hz, 2H), 1.37 (d, J = 7.0 Hz, 6H). |

TABLE 3-continued

| KS-047 |
|---|
| 1H NMR (400 MHz, DMSO-$d_6$) δ 12.21 (s, 1H), 8.09 (t, J = 5.6 Hz, 1H), 7.61 (m, 2H), 7.53 (dd, J = 9.0, 6.9 Hz, 1H), 7.41 (d, J = 8.7 Hz, 2H), 7.31 (d, J = 15.8 Hz, 1H), 6.80 (d, J = 8.6 Hz, 2H), 6.45 (d, J = 15.8 Hz, 1H), 4.84 (s, 2H), 2.58 (s, 3H), 2.43 (t, J = 6.7 Hz, 2H). |
| KS-048 |
| 1H NMR (400 MHz, Acetone-$d_6$) δ 7.75 (m, 2H), 7.50 (m, 6H), 7.05 (d, J = 8.8 Hz, 2H), 6.60 (d, J = 15.6 Hz, 1H), 5.04 (s, 2H), 3.55 (t, J = 6.5 Hz, 2H), 2.59 (t, J = 6.6 Hz, 2H), 2.55 (s, 3H). |
| KS-049 |
| 1H NMR (400 MHz, Chloroform-d) δ 7.54 (d, J = 15.6 Hz, 1H), 7.38 (m, 4H), 7.32 (m, 1H), 6.76 (d, J = 8.8 Hz, 2H), 6.28 (d, J = 15.6 Hz, 1H), 6.19 (d, J = 7.7 Hz, 1H), 4.74 (m, 3H), 3.77 (s, 3H), 3.32 (m, 1H), 1.46 (d, J = 7.2 Hz, 3H), 1.41 (d, J = 7.0 Hz, 6H). |
| KS-050 |
| 1H NMR (400 MHz, Chloroform-d) δ 7.53 (d, J = 15.6 Hz, 1H), 7.36 (m, 5H), 6.75 (d, J = 8.8 Hz, 2H), 6.29 (m, 2H), 4.73 (m, 3H), 3.76 (s, 3H), 2.55 (s, 3H), 1.45 (d, J = 7.1 Hz, 3H). |
| KS-051 |
| 1H NMR (400 MHz, Chloroform-d) δ 7.68 (m, 2H), 7.59 (d, J = 15.6 Hz, 1H), 7.59 (m, 5H), 6.93 (d, J = 8.7 Hz, 2H), 6.34 (m, 2H), 4.86 (s, 2H), 4.74 (p, J = 7.2 Hz, 1H), 3.77 (s, 3H), 2.50 (s, 3H), 1.47 (d, J = 7.1 Hz, 3H). |
| KS-052 |
| 1H NMR (400 MHz, Methanol-$d_4$) δ 7.46 (m, 6H), 6.79 (d, J = 8.8 Hz, 2H), 6.51 (d, J = 15.7 Hz, 1H), 4.84 (s, 2H), 4.50 (q, J = 7.3 Hz, 1H), 3.41 (h, J = 7.0 Hz, 1H), 1.44 (d, J = 7.3 Hz, 3H), 1.41 (d, J = 7.0 Hz, 6H). |
| KS-053 |
| 1H NMR (400 MHz, Acetone-$d_6$) δ 7.54 (m, 4H), 7.45 (m, 3H), 6.84 (d, J = 8.8 Hz, 2H), 6.61 (d, J = 15.7 Hz, 1H), 4.91 (s, 2H), 4.57 (m, 1H), 2.60 (s, 3H), 1.42 (d, J = 7.3 Hz, 3H). |
| KS-054 |
| 1H NMR (400 MHz, Methanol-d4) δ 7.68 (m, 2H), 7.47 (m, 6H), 6.99 (d, J = 8.8 Hz, 2H), 6.56 (d, J = 15.8 Hz, 1H), 4.95 (s, 2H), 4.51 (q, J = 7.3 Hz, 1H), 2.51 (s, 3H), 1.45 (d, J = 7.3 Hz, 3H). |

Example 2

Example 2-1 Culturing of Experimental Cell Line

HepG2 cells were purchased from ATCC (Manassas, VA, USA) and cultured in Dulbecco's modified Eagle's medium (DMEM; Hyclone) containing 10% fetal bovine serum (FBS, Hyclone, Logan, UT, USA), 50 units/mL penicillin (Hyclone) and 50 μg/mL streptomycin (Hyclone). All cells were cultured to have a confluency of about 80% to 90% under the conditions of 37° C. and 5% $Co_2$.

Example 2-2 Farnesol X Receptor (FXR) Reporter Gene Assay

In order to measure FXR transcription factor activity, HepG2 cells ($1\times10^5$ cells/well) were cultured in a 48-well cell culture plate (SPL Life Science Co., Gyeonggido, Korea) for 20 hours and then transduced using Lipofectamin L3000 (Invitrogen, San Diego, CA, USA). Luciferase is an enzyme that catalyzes light-emitting reactions. A plasmid in which the firefly luciferase gene was fused to farnesol X receptor (FXR) and a plasmid in which the renilla luciferase gene was fused to thymidine kinase (TK) were used for transduction. Reacted were 25 μL of serum and antibiotic-free Opti-MEM® (Life Technologies, Grand Island, NY) and 0.5 μL of Lipofectamin L3000 per 0.5 μg of FXR-firefly luciferase plasmid and 10 ng of TK-renilla luciferase plasmid, and the cells were reacted with the reaction mixture for 24 hours. Thereafter, DMEM medium containing 0.1% serum was treated with a drug for 24 hours. After the reaction was completed, the drug-treated culture medium was discarded, and lysis buffer was added at 0.4 ml/well to remove the cells, then the cells were dispensed into a 96-well white plate (SPL Life Science Co.), and the luminescence level was measured using the Dual-glo Luciferase Assay System (Promega, Madison, WI, USA). For the firefly luciferase activity (to see the level of FXR expression) and renilla luciferase activity (to provide a reference value by showing constant expression), the luminescence level was measured using the GloMax Multi Detection System (Promega) and then the relative ratio (firefly luciferase activity/renilla luciferase activity) was calculated.

As presented in Table 4 below, the FXR activating effect of each compound was confirmed.

TABLE 4

| Number | Dose | FXR fold induction |
|---|---|---|
| Con | 0 | 1.00 |
| GW4064 | 5 uM | 2.92 |
| GW4064 | 10 uM | 3.96 |
| CDCA | 50 uM | 5.07 |
| CDCA | 100 uM | 13.23 |
| KS-001 | 10 uM | 1.22 |
| KS-002 | 10 uM | 1.22 |
| KS-003 | 10 uM | 1.10 |

TABLE 4-continued

| Number | Dose | FXR fold induction |
|---|---|---|
| KS-004 | 10 uM | 2.03 |
| KS-005 | 10 uM | 1.21 |
| KS-006 | 10 uM | 1.38 |
| KS-007 | 10 uM | 1.02 |
| KS-008 | 10 uM | 1.50 |
| KS-009 | 10 uM | 1.44 |
| KS-010 | 10 uM | 10.51 |
| KS-011 | 10 uM | 1.65 |
| KS-012 | 10 uM | 1.61 |
| KS-013 | 10 uM | 1.46 |
| KS-014 | 10 uM | 1.42 |
| KS-015 | 10 uM | 2.65 |
| KS-016 | 10 uM | 1.99 |
| KS-017 | 10 uM | 1.14 |
| KS-018 | 10 uM | 1.28 |
| KS-019 | 10 uM | 1.19 |
| KS-020 | 10 uM | 1.39 |
| KS-021 | 10 uM | 2.01 |
| KS-022 | 10 uM | 3.34 |
| KS-023 | 10 uM | 1.93 |
| KS-024 | 10 uM | 1.68 |
| KS-025 | 10 uM | 10.93 |
| KS-026 | 10 uM | 1.26 |
| KS-027 | 10 uM | 1.04 |
| KS-028 | 10 uM | 7.44 |
| KS-029 | 10 uM | 1.71 |
| KS-030 | 10 uM | 0.82 |
| KS-031 | 10 uM | 4.02 |
| KS-032 | 10 uM | 1.89 |
| KS-033 | 10 uM | 0.93 |
| KS-034 | 10 uM | 8.91 |
| KS-035 | 10 uM | 1.65 |
| KS-036 | 10 uM | 1.24 |
| KS-037 | 10 uM | 7.95 |
| KS-038 | 10 uM | 2.21 |
| KS-039 | 10 uM | 1.06 |
| KS-040 | 10 uM | 9.00 |
| KS-041 | 10 uM | 3.23 |
| KS-042 | 10 uM | 1.41 |
| KS-043 | 10 uM | 10.02 |
| KS-044 | 10 uM | 2.21 |
| KS-045 | 10 uM | 1.20 |
| KS-046 | 10 uM | 11.37 |
| KS-047 | 10 uM | 3.04 |
| KS-048 | 10 uM | 1.13 |
| KS-049 | 10 uM | 9.55 |
| KS-050 | 10 uM | 2.00 |
| KS-051 | 10 uM | 1.34 |
| KS-052 | 10 uM | 8.12 |
| KS-053 | 10 uM | 1.28 |
| KS-054 | 10 uM | 0.9 |

As can be seen from Table 4, KS-010, KS-025, KS-028, KS-034, KS-037, KS-040, KS-043, KS-046, KS-049, and KS-052 are superior to GW4064, which is known as an FXR agonist, in the FXR activating effect and are thus confirmed to have an excellent FXR activating effect.

The invention claimed is:

1. A cinnamic amide derivative selected from the following Table 5, a solvate, or a pharmaceutically acceptable salt of the cinnamic amide derivative:

TABLE 5

| No. | Name |
|---|---|
| KS-010 | Ethyl (E)-(3-(4-((3-(2,6-dichlorophenyl)-5-isopropylisoxazol-4-yl)methoxy)phenyl)acryloyl)glycinate |
| KS-025 | ethyl (E)-(3-(4-((3-(2,6-dichlorophenyl)-5-isopropylisoxazol-4-yl)methoxy)phenyl)acryloyl)-L-alaninate |
| KS-028 | (E)-(3-(4-((3-(2,6-dichlorophenyl)-5-isopropylisoxazol-4-yl)methoxy)phenyl)acryloyl)-L-alanine |
| KS-034 | (E)-(3-(4-((3-(2,6-dichlorophenyl)-5-isopropylisoxazol-4-yl)methoxy)phenyl)acryloyl)-L-valine |
| KS-037 | methyl (E)-(3-(4-((3-(2,6-dichlorophenyl)-5-isopropylisoxazol-4-yl)methoxy)phenyl)acryloyl)-L-phenylalaninate |
| KS-040 | (E)-(3-(4-((3-(2,6-dichlorophenyl)-5-isopropylisoxazol-4-yl)methoxy)phenyl)acryloyl)-L-phenylalanine |
| KS-043 | methyl (E)-3-(3-(4-((3-(2,6-dichlorophenyl)-5-isopropylisoxazol-4-yl)methoxy)phenyl)acrylamido)propanoate |
| KS-046 | (E)-3-(3-(4-((3-(2,6-dichlorophenyl)-5-isopropylisoxazol-4-yl)methoxy)phenyl)acrylamido)propanoic acid |
| KS-049 | methyl (E)-(3-(4-((3-(2,6-dichlorophenyl)-5-isopropylisoxazol-4-yl)methoxy)phenyl)acryloyl)-D-alaninate |
| KS-052 | (E)-(3-(4-((3-(2,6-dichlorophenyl)-5-isopropylisoxazol-4-yl)methoxy)phenyl)acryloyl)-D-alanine. |

2. A composition for ameliorating or treating metabolic syndrome, the composition comprising the cinnamic amide derivative, the solvate, or the pharmaceutically acceptable salt of the cinnamic amide derivative according to claim 1.

3. The composition according to claim 2, further comprising a pharmaceutical composition, an herbal extract, a fraction of the herbal extract, or a medicament for ameliorating and/or treating metabolic syndrome.

4. A method for ameliorating or treating metabolic syndrome by administration of the composition according to claim 2.

5. A method for ameliorating and/or treating at least one selected from the group consisting of diabetes, obesity, dyslipidemia, hypertension, hyperinsulinemia, hyperlipidemia, hypertriglyceridemia, arteriosclerosis, cardiovascular disease, liver disease, lung disease, breast cancer and ischemia-reperfusion injury by administration of the composition according to claim 2.

6. A method for ameliorating or treating at least one selected from the group consisting of non-alcoholic steatohepatitis (NASH), non-alcoholic fatty liver disease (NAFLD), non-small cell lung cancer, liver cancer, hepatitis, liver fibrosis, liver cirrhosis, jaundice and liver failure by administration of the composition according to claim 2.

7. A method for activating FXR by administration of the composition according to claim 2.

* * * * *